US009363159B2

(12) United States Patent
Pugaczewski

(10) Patent No.: US 9,363,159 B2
(45) Date of Patent: Jun. 7, 2016

(54) NETWORK MANAGEMENT LAYER—CONFIGURATION MANAGEMENT

(71) Applicant: CenturyLink Intellectual Property LLC, Denver, CO (US)

(72) Inventor: John T. Pugaczewski, Hugo, MN (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 14/462,778

(22) Filed: Aug. 19, 2014

(65) Prior Publication Data

US 2015/0049641 A1    Feb. 19, 2015

Related U.S. Application Data

(60) Provisional application No. 61/867,461, filed on Aug. 19, 2013.

(51) Int. Cl.
*H04L 12/28* (2006.01)
*H04L 12/751* (2013.01)
*H04L 12/24* (2006.01)

(52) U.S. Cl.
CPC .............. *H04L 45/02* (2013.01); *H04L 41/022* (2013.01); *H04L 41/0206* (2013.01); *H04L 41/5054* (2013.01)

(58) Field of Classification Search
None
See application file for complete search history.

(56) References Cited

U.S. PATENT DOCUMENTS 8,675,488 B1 * 3/2014 Sidebottom ........... H04L 67/141
370/229

8,693,323 B1 * 4/2014 McDysan ............... H04L 45/50
370/230

(Continued)

FOREIGN PATENT DOCUMENTS

EP    2418802 A1    2/2012

OTHER PUBLICATIONS

International Search Report and Written Opinion prepared by the Korean Intellectual Property Office as International Searching Authority for PCT International Patent Application No. PCT/US14/51667, mailed Nov. 24, 2014, 9 pages.

(Continued)

*Primary Examiner* — Kwang B Yao
*Assistant Examiner* — Juvena Loo
(74) *Attorney, Agent, or Firm* — Swanson & Bratschun, L.L.C.

(57) ABSTRACT

Novel tools and techniques are provided for implementing network management layer configuration management. In some embodiments, a system might determine one or more network devices in a network for implementing a service arising from a service request that originates from a client device over the network. The system might further determine network technology utilized by each of the one or more network devices, and might generate flow domain information (in some cases, in the form of a flow domain network ("FDN") object), using flow domain analysis, based at least in part on the determined network devices and/or the determined network technology. The system might automatically configure at least one of the network devices to enable performance of the service (which might include, without limitation, service activation, service modification, fault isolation, and/or performance monitoring), based at least in part on the generated flow domain information.

17 Claims, 13 Drawing Sheets

(56) References Cited

U.S. PATENT DOCUMENTS

| | | | |
|---|---|---|---|
| 8,948,207 B2* | 2/2015 | DelRegno | H04L 47/10 370/466 |
| 2005/0251584 A1 | 11/2005 | Monga et al. | |
| 2006/0109802 A1* | 5/2006 | Zelig | H04L 12/42 370/258 |
| 2006/0133405 A1* | 6/2006 | Fee | H04Q 3/005 370/437 |
| 2006/0153070 A1* | 7/2006 | DelRegno | H04M 3/2254 370/229 |
| 2008/0003998 A1* | 1/2008 | Small | H04L 12/2602 455/422.1 |
| 2008/0046597 A1 | 2/2008 | Stademann et al. | |
| 2008/0049621 A1* | 2/2008 | McGuire | H04L 12/24 370/236.2 |
| 2010/0002722 A1 | 1/2010 | Porat et al. | |
| 2012/0263186 A1* | 10/2012 | Ueno | H04L 45/38 370/401 |
| 2015/0026809 A1 | 1/2015 | Altman et al. | |

OTHER PUBLICATIONS

Publication Notice of PCT International Patent Application No. PCT/US2014/051667; mailed Feb. 26, 2015; 1 page.

International Preliminary Report on Patentability for PCT International Patent Application No. PCT/US2014/051667; mailed Mar. 3, 2016; 6 pages.

* cited by examiner

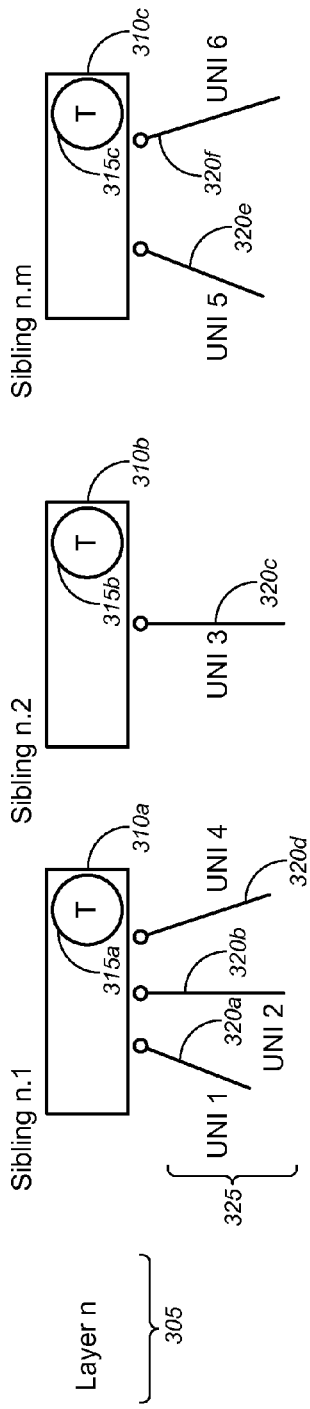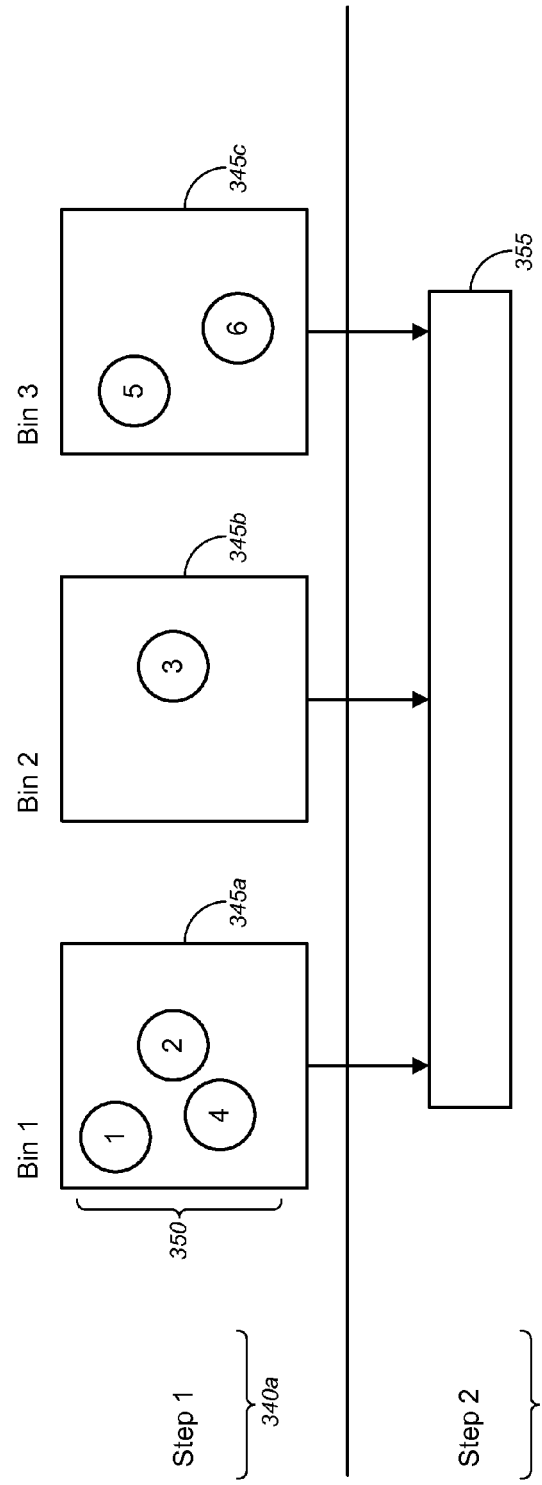

NETWORK MANAGEMENT LAYER—CONFIGURATION MANAGEMENT

CROSS-REFERENCES TO RELATED APPLICATIONS

This application claims priority to U.S. Patent Application Ser. No. 61/867,461 (the "'461 application"), filed Aug. 19, 2013 by John T. Pugaczewski, entitled, "Network Management Layer—Configuration Management," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to network communications, and more particularly to methods, systems, and computer software for implementing communications network methodologies for determination of network connectivity path given a service request. In some cases, a resultant path might be used to automatically configure network devices directly or indirectly to activate a bearer plane for user traffic flow.

BACKGROUND

Existing network architectures in support of Metro Ethernet Forum ("MEF") services include multiple technologies and multiple vendors. Typically, this will result in complicated logic in breaking down the service request and determining how to map the service attributes to corresponding network device configurations.

For example, a MEF service request with two user network interfaces ("UNIs") and an Ethernet virtual connection or circuit ("EVC") is sent from the client to the support system(s) responsible for communicating with the network. The support system must determine the underlying technology (including, but not limited to, virtual private local area network ("LAN") service ("VPLS"), IEEE 802.1ad (otherwise referred to as "Q-in-Q," "QinQ," or "Q in Q")) and corresponding vendors. The determination of this connectivity can be persistently stored in part or whole. If the technology and/or vendors change, there is typically a significant development effort in order to keep the automation of service request to underlying network activation and corresponding bearer plane flow.

Hence, there is a need for more robust and scalable solutions for implementing communications network methodologies for determination of network connectivity path. In particular, there is a need for a system that overcomes the complexity of multi-technology and multi-vendor networks in support of service activation. Further, there is a need to have a solution that can be used across multiple services, products, and underlying networks for automated service activation.

BRIEF SUMMARY

Various embodiments provide techniques for implementing network management layer configuration management. In particular, various embodiments provide techniques for implementing communications network methodologies for determination of network connectivity path given a service request. In some embodiments, a resultant path might be used to automatically configure network devices directly or indirectly to activate a bearer plane for user traffic flow.

In some embodiments, a system might determine one or more network devices in a network for implementing a service arising from a service request that originates from a client device over the network. The system might further determine network technology utilized by each of the one or more network devices, and might generate flow domain information (in some cases, in the form of a flow domain network ("FDN") object), using flow domain analysis, based at least in part on the determined network devices and/or the determined network technology. The system might automatically configure at least one of the network devices to enable performance of the service (which might include, without limitation, service activation, service modification, fault isolation, and/or performance monitoring), based at least in part on the generated flow domain information.

According to some embodiments, given a Metro Ethernet Forum ("MEF") service of two or more UNIs and an Ethernet virtual circuit or connection ("EVC") as input, a detailed an NML-CM flow domain logic algorithm may be used to return or output a computed graph or path (in some cases, in the form of a FDN object). Using the algorithm and the methodology described above, a MEF-defined service may determine the underlying set of network components and connectivity associations required to provide bearer plane service. The returned or outputted graph (in some instances, the FDN object) can then be used to perform the necessary service activation, service modification, fault isolation, and/or performance monitoring, or the like across multiple technologies and multiple vendors.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a method might comprise receiving, with a first network device in a network, a service request, the service request originating from a first client device over the network, determining, with the first network device, one or more second network devices for implementing a service arising from the service request, and determining, with the first network device, network technology utilized by each of the one or more second network devices. The method might further comprise generating, with the first network device, flow domain information, using flow domain analysis, based at least in part on the determined one or more second network devices and based at least in part on the determined network technology utilized by each of the one or more second network devices. The method might also comprise automatically configuring, with a third network device in the network, at least one of the one or more second network devices to enable performance of the service arising from the service request, based at least in part on the generated flow domain information.

In some embodiments, generating, with the first network device, flow domain information, using flow domain analysis, based at least in part on the determined one or more second network devices and based at least in part on the determined network technology utilized by each of the one or more second network devices might comprise generating, with the first network device, a flow domain network ("FDN") object, using flow domain analysis, based at least in part on the determined one or more second network devices and based at least in part on the determined network technology utilized by each of the one or more second network devices. In some cases, generating, with the first network device, the FDN object, using flow domain analysis might comprise generating, with the first network device, a computed graph of flow domains indicating one or more network paths in the network through the one or more second network devices and indicating relevant connectivity associations of the one or more second network devices. In some instances, generating, with the first network device, the FDN object, using flow domain analysis might comprise utilizing an outside-in analysis that first analyzes relevant user network interfaces.

According to some embodiments, the service request might comprise a Metro Ethernet Forum ("MEF") service request. In some cases, determining, with the first network device, network technology utilized by each of the one or more second network devices might comprise mapping, with the first network device, MEF services associated with the service request with the network technology utilized by each of the one or more second network devices. In some embodiments, mapping, with the first network device, MEF services associated with the service request with the network technology utilized by each of the one or more second network devices might comprise implementing, with the first network device, an intermediate abstraction between the MEF services and the network technology utilized by each of the one or more second network devices, using a layer network domain.

In some instances, the MEF service request might comprise vectors of at least two user network interfaces ("UNIs") and at least one Ethernet virtual circuit ("EVC"). According to some embodiments, generating, with the first network device, the flow domain information might comprise determining, with the first network device, a network path connecting each of the at least two UNIs with the at least one EVC and generating, with the first network device, the flow domain information, wherein the flow domain information indicates the determined network path connecting each of the at least two UNIs with the at least one EVC and indicates connectivity associations for each of the at least two UNIs with the at least one EVC.

Merely by way of example, in some embodiments, generating, with the first network device, the flow domain information, using flow domain analysis, might comprise performing, with the first network device, an edge flow domain analysis, determining, with the first network device, whether at least one of the one or more second network devices is included in a flow domain comprising an intra-provider edge router system for multi-dwelling units ("intra-MTU-s"), based on the edge flow domain analysis, and based on a determination that at least one of the one or more second network devices is included in a flow domain comprising an intra-MTU-s, determining, with the first network device, one or more edge flow domains. Generating the flow domain information might comprise, based on a determination that at least one of the one or more second network devices does not include a flow domain comprising an intra-MTU-s, performing, with the first network device, a ring flow domain analysis, determining, with the first network device, whether at least one of the one or more second network devices is included in one or more G.8032 ring flow domains, based on the ring flow domain analysis, and based on a determination that at least one of the one or more second network devices is included in one or more G.8032 ring flow domains, determining, with the first network device, the one or more G.8032 flow domains. In some cases, generating the flow domain information might comprise, based on a determination that at least one of the one or more second network devices is not included in one or more G.8032 ring flow domains, performing, with the first network device, an aggregate flow domain analysis, determining, with the first network device, whether at least one of the one or more second network devices is included in one or more aggregate flow domains, based on the aggregate flow domain analysis, and based on a determination that at least one of the one or more second network devices is included in one or more aggregate flow domains, determining, with the first network device, the one or more aggregate flow domains.

According to some embodiments, generating the flow domain information might comprise, based on a determination that at least one of the one or more second network devices is not included in one or more aggregate flow domains, performing, with the first network device, a hierarchical virtual private local area network service ("H-VPLS") flow domain analysis, determining, with the first network device, whether at least one of the one or more second network devices is included in one or more H-VPLS flow domains, based on the H-VPLS flow domain analysis, and based on a determination that at least one of the one or more second network devices is included in one or more H-VPLS flow domains, determining, with the first network device, the one or more one or more H-VPLS flow domains. In some cases, generating the flow domain information might comprise, based on a determination that at least one of the one or more second network devices is not included in one or more H-VPLS flow domains, performing, with the first network device, a virtual private local area network service ("VPLS") flow domain analysis, determining, with the first network device, whether at least one of the one or more second network devices is included in one or more VPLS flow domains, based on the VPLS flow domain analysis, and based on a determination that at least one of the one or more second network devices is included in one or more VPLS flow domains, determining, with the first network device, the one or more VPLS flow domains.

In some embodiments, generating the flow domain information might comprise, based on a determination that at least one of the one or more second network devices is not included in one or more VPLS flow domains, performing, with the first network device, a flow domain analysis for a provider edge router having routing and switching functionality ("PE_rs flow domain analysis"), determining, with the first network device, whether at least one of the one or more second network devices is included in a flow domain comprising one or more PE_rs, based on the PE_rs flow domain analysis, and based on a determination that at least one of the one or more second network devices is included in a flow domain comprising one or more PE_rs, determining, with the first network device, one or more PE_rs flow domains. In some instances, generating the flow domain information might comprise, based on a determination that at least one of the one or more second network devices is not included in a flow domain comprising one or more PE_rs, performing, with the first network device, an interconnect flow domain analysis, determining, with the first network device, whether at least one of the one or more second network devices is included in a flow domain comprising an external network-to-network interface ("E-NNP"), based on the interconnect flow domain analysis, and based on a determination that at least one of the one or more second network devices is included in a flow domain comprising an E-NNI, determining, with the first network device, one or more service provider or operator flow domains.

According to some embodiments, generating, with the first network device, the flow domain information, using flow domain analysis, might further comprise stitching, with the first network device, at least one of the determined one or more edge flow domains, the determined one or more G.8032 flow domains, the determined one or more aggregate flow domains, the determined one or more one or more H-VPLS flow domains, the determined one or more VPLS flow domains, the determined one or more PE_rs flow domains, or the determined one or more service provider or operator flow domains to generate the flow domain information indicating a flow domain network.

In some cases, the service arising from the service request might comprise at least one of service activation, service modification, service assurance, fault isolation, or performance monitoring. In some embodiments, the first network device might comprise one of a network management layer-configuration management ("NML—CM") controller or a layer 3/layer 2 flow domain ("L3/L2 FD") controller. In some instances, the third network device might comprise one of a layer 3/layer 2 element management layer-configuration management ("L3/L2 EML—CM") controller, a NML—CM activation engine, a NML-CM modification engine, a service assurance engine, a fault isolation engine, or a performance monitoring engine. According to some embodiments, the first network device and the third network device might be the same network device. In some cases, each of the one or more second network devices might comprise one of a user-side provider edge ("U-PE") router, a network-side provider edge ("N-PE") router, a provider ("P") router, and/or an internal network-to-network interface ("I-NNP") device. In some instances, the network technology might comprise one or more of G.8032 Ethernet ring protection switching ("G.8032 ERPS") technology, aggregation technology, hierarchical virtual private local area network service ("H-VPLS") technology, packet on a blade ("POB") technology, provider edge having routing and switching functionality ("PE_rs")-served user network interface ("UNI") technology, multi-operator technology, and/or virtual private local area network service ("VPLS") technology.

In another aspect, a network device might comprise at least one processor and a non-transitory computer readable medium communicatively coupled to the at least one processor. The computer readable medium might have stored thereon computer software comprising a set of instructions that, when executed by the at least one processor, causes the network device to perform one or more functions. The set of instructions might comprise instructions for receiving a service request, the service request originating from a first client device over the network, instructions for determining one or more second network devices for implementing a service arising from the service request, and instructions for determining, with the first network device, network technology utilized by each of the one or more second network devices. The set of instructions might further comprise instructions for generating, with the first network device, flow domain information, using flow domain analysis, based at least in part on the determined one or more second network devices and based at least in part on the determined network technology utilized by each of the one or more second network devices. The flow domain information might be used to automatically configure the at least one of the one or more second network devices to enable performance of the service arising from the service request.

In yet another aspect, a system might comprise a first network device, one or more second network devices, and a third network device. The first network device might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first network device to perform one or more functions. The first set of instructions might comprise instructions for receiving a service request, the service request originating from a first client device over the network, instructions for determining one or more second network devices for implementing a service arising from the service request, and instructions for determining, with the first network device, network technology utilized by each of the one or more second network devices. The first set of instructions might further comprise instructions for generating, with the first network device, flow domain information, using flow domain analysis, based at least in part on the determined one or more second network devices and based at least in part on the determined network technology utilized by each of the one or more second network devices.

The third network device might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the third network device to perform one or more functions. The third set of instructions might comprise instructions for receiving the flow domain information from the first network device and instructions for automatically configuring the at least one of the one or more second network devices to enable performance of the service arising from the service request, by sending configuration instructions to the at least one of the one or more second network devices.

Each of the one or more second network devices might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the second network device to perform one or more functions. The second set of instructions might comprise instructions for receiving the configuration instructions from the third network device and instructions for changing network configuration settings, based on the configuration instructions.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 3B is a block diagram illustrating exemplary layer n sibling check for FDN derivation, in accordance with various embodiments.

FIG. 3C is a block diagram illustrating exemplary FDN derivation utilizing a set of bins each for grouping user network interfaces ("UNIs") that share the same edge serving device, in accordance with various embodiments.

DETAILED DESCRIPTION OF CERTAIN EMBODIMENTS

Figure 1:
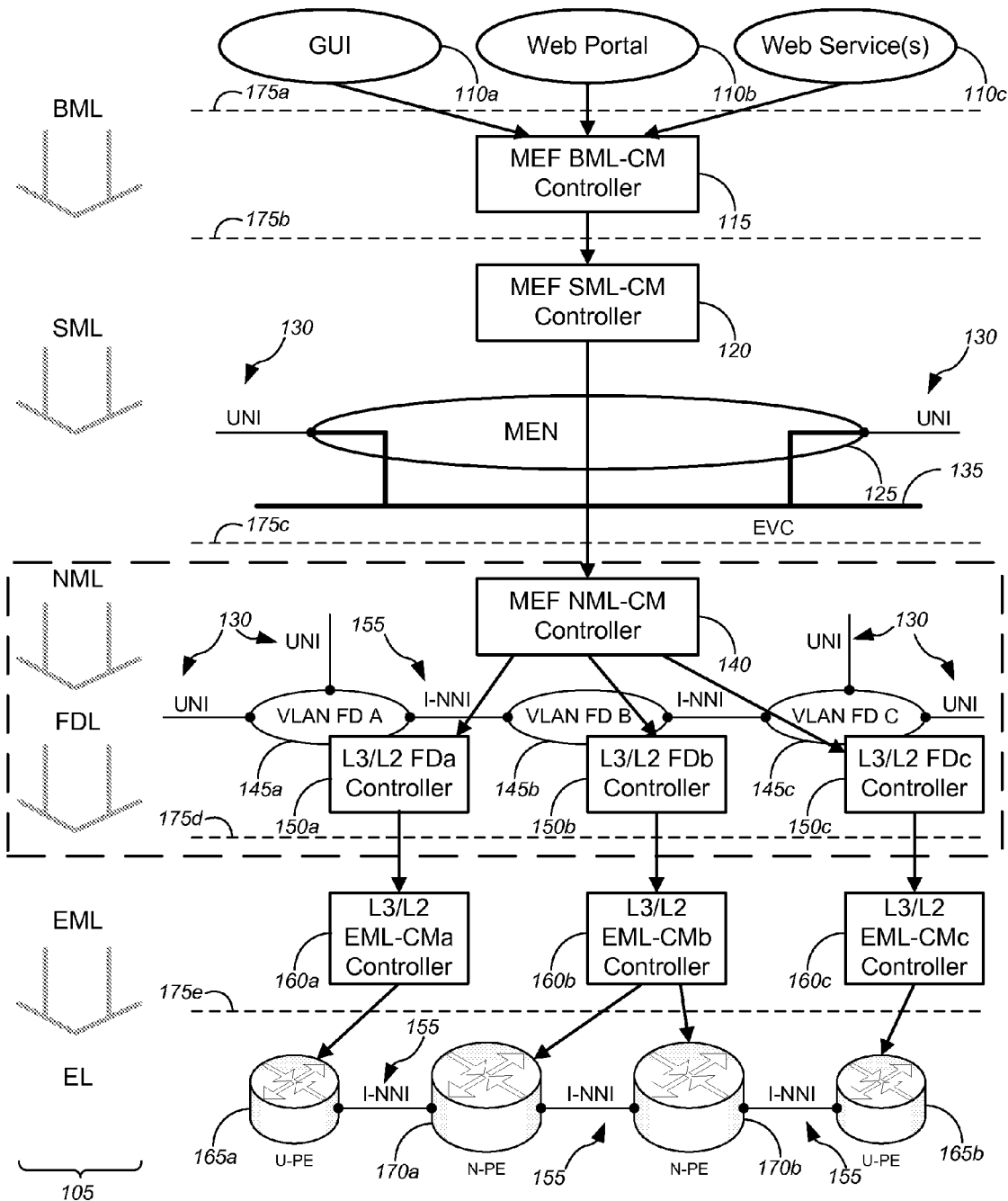
FIG. 1 is a block diagram illustrating a system representing network management layer-configuration management ("NML-CM") network logic, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide techniques for implementing network management layer configuration management. In particular, various embodiments provide techniques for implementing communications network methodologies for determination of network connectivity path given a service request. In some embodiments, a resultant path might be used to automatically configure network devices directly or indirectly to activate a bearer plane for user traffic flow. Herein, "bearer plane" might refer to a user plane or data plane that might carry user or data traffic for a network, while "control plane" might refer to a plane that carries control information for signaling purposes, and "management plane" might refer to a plane that carries operations and administration traffic for network management. Herein also, data traffic or network traffic might have traffic patterns denoted as one of "north traffic," "east traffic," "south traffic," or "west traffic." North (or northbound) and south (or southbound) traffic might refer to data or network traffic between a client and a server, while east (or eastbound) and west (or westbound) traffic might refer to data or network traffic between two servers.

In some embodiments, a system might determine one or more network devices in a network for implementing a service arising from a service request that originates from a client device over the network. In some cases, the service might include, without limitation, service activation, service modification, fault isolation, and/or performance monitoring, or the like.

The system might further determine network technology utilized by each of the one or more network devices, and might generate flow domain information (in some cases, in the form of a flow domain network ("FDN") object), using flow domain analysis, based at least in part on the determined network devices and/or the determined network technology. According to some embodiments, the network technology might include, but is not limited to, one or more of G.8032 Ethernet ring protection switching ("G.8032 ERPS") technology, aggregation technology, hierarchical virtual private local area network service ("H-VPLS") technology, packet on a blade ("POB") technology, provider edge having routing and switching functionality ("PE_rs")-served user network interface ("UNI") technology, multi-operator technology, and/or virtual private local area network service ("VPLS") technology.

The system might automatically configure at least one of the network devices to enable performance of the service, based at least in part on the generated flow domain information.

In some embodiments, given a Metro Ethernet Forum ("MEF") service of two or more UNIs and an Ethernet virtual circuit or connection ("EVC") as input, a detailed an NML-CM flow domain logic algorithm or NML-CM flow domain algorithm may be used to return or output a computed graph or path (in some cases, in the form of a FDN object). Using the algorithm and the methodology described above, a MEF-defined service may determine the underlying set of network components and connectivity associations required to provide bearer plane service. The returned or outputted graph (in some instances, the FDN object) can then be used to perform the necessary service activation, service modification, fault isolation, and/or performance monitoring, or the like across multiple technologies and multiple vendors.

According to some embodiments, the NML-CM flow domain algorithm might leverage the concepts provided in the technical specifications for MEF 7.2: Carrier Ethernet Management Information Model (April 2013; hereinafter referred to simply as "MEF 7.2"), which is incorporated herein by reference in its entirety for all purposes. Similar to the recursive flow domain (sub-network) derivation described in MEF 7.2, the NML-CM flow domain algorithm recursively generates a graph (network) of flow domains. The returned value(s) from successfully invocation of the algorithm might be a FDN object.

The FDN object is intended to be used by clients, including, but not limited to, a NML-CM activation engine, or the like. In some cases, the service fulfillment process might use the FDN information during a new service activation process. The service fulfillment process might also use the FDN information during a service modification process. Other clients can use the FDN object for service assurance processes, including without limitation, fault isolation.

A layer network domain ("LND") with flow domains might provide an intermediate abstraction between the MEF service(s) and the underlying network technology. The software logic/algorithms might be developed to map MEF service(s) to underlying flow domain network. The flow domain network may then be mapped to the underlying network technology.

One benefit of this framework might include that future changes in underlying technology do not require changes to MEF service-aware functionality. In a specific (non-limiting) example, a move from virtual local area network ("VLAN") or virtual private LAN service ("VPLS") flow domains to multiprotocol label switching-transport protocol ("MPLS-TP") flow domains does not require business management layer ("BML") and/or service management layer ("SML") support system changes.

The framework provides a technology and software layering and abstraction that reduces long term development costs. A change in a vendor(s) supporting the existing or new technology only requires modification of the NML-to-EML support systems.

Key in the derivation of the graph (or FDN object) is the need to derive topology from potentially multiple sources. These sources might include, but are not limited to, the network devices, support systems (including, e.g., element management systems ("EMSs"), etc.) and databases. A major goal of the topology engine is to limit and throttle the access to the network. The reason for limiting or throttling access is that each access request of a device has a corresponding cost, which might include, but is not limited to, increased levels of device and network resources. Device and network resources might include, without limitation, CPU utilization, memory, bandwidth, and/or the like. Keeping these resources at or below optimal levels is an important aspect of the aforementioned major goal.

The combination of the EMS and controlled devices can provide varying levels of network/device protection. For example, an EMS that asynchronously responds to events and incrementally queries the network/device is better than a solution that is constantly polling.

We now turn to the embodiments as illustrated by the drawings. FIGS. 1-7 illustrate some of the features of the method, system, and apparatus for implementing network management layer configuration management, as referred to above. The methods, systems, and apparatuses illustrated by FIGS. 1-7 may refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a block diagram illustrating a system 100 representing network management layer-configuration management ("NML-CM") network logic, in accordance with various embodiments. In FIG. 1, system 100 might comprise a plurality of layers 105, including, but not limited to, a business management layer ("BML"), a service management layer ("SML"), a network management layer ("NML"), a flow domain layer ("FDL"), an element management layer ("EML"), an element layer ("EL"), and/or the like. System 100 might further comprise a plurality of user-side or customer-side interfaces or interface devices 110, including, without limitation, one or more graphical user interfaces ("GUIs") 110a, one or more web portals 110b, one or more web services 110c.

In some embodiments, system 100 might further comprise a Metro Ethernet Forum ("MEF") business management layer-configuration management ("BML-CM") controller 115, which is located at the BML, and a MEF service management layer-configuration management ("SML-CM") controller 120, which is located at the SML. Also located at the SML might be a Metro Ethernet Network ("MEN") 125, the edges of which might be communicatively coupled to two or more user network interfaces ("UNIs") 130. In some cases, the two or more UNIs 130 might be linked by an Ethernet virtual connection or Ethernet virtual circuit ("EVC") 135. At the NML, system 100 might comprise a MEF network management layer-configuration management ("NML-CM") controller 140, while at the FDL, system 100 might comprise a plurality of virtual local area network ("VLAN") flow domains 145 and a plurality of flow domain controllers 150.

In some embodiments (such as shown in FIG. 1), the plurality of VLAN flow domains 145 might include, without limitation, a first VLAN flow domain A 145a, a second VLAN flow domain B 145b, and a third VLAN flow domain C 145c. A plurality of UNIs 130 might communicatively couple to edge VLAN flow domains, such as the first VLAN flow domain A 145a and the third VLAN flow domain C 145c (in the example of FIG. 1). The edge VLAN flow domains (i.e., the first VLAN flow domain A 145a and the third VLAN flow domain C 145c) might each communicatively couple with inner VLAN flow domains (i.e., the second VLAN flow domain B 145b) via one or more internal network-to-network interfaces ("I-NNP") 155. In some cases, each of the plurality of the flow domain controllers 150 might be part of the corresponding one of the plurality of VLAN flow domains 145. In some instances, each of the plurality of the flow domain controllers 150 might be separate from the corresponding one of the plurality of VLAN flow domains 145, although communicatively coupled therewith; in some embodiments, each separate flow domain controller 150 and each corresponding VLAN flow domain 145 might at least in part be co-located. In the example of FIG. 1, flow domain a controller 150a might be part of (or separate from, yet communicatively coupled to) the first VLAN flow domain A 145a, while flow domain b controller 150b might be part of (or separate from, yet communicatively coupled to) the second VLAN flow domain B 145b, and flow domain c controller 150c might be part of (or separate from, yet communicatively coupled to) the third VLAN flow domain C 145c. According to some embodiments, the plurality of flow domain controllers 150 might include layer 3/layer 2 ("L3/L2") flow domain controllers 150. As understood in the art, "layer 3" might refer to a network layer, while "layer 2" might refer to a data link layer.

At the EML, system 100 might further comprise a plurality of L3/L2 element management layer-configuration management ("EML-CM") controllers 160. As shown in the embodiment of FIG. 1, the plurality of L3/L2 EML-CM controllers 160 might comprise a first L3/L2 EML-CM a controller 160a, a second L3/L2 EML-CM b controller 160b, and a third L3/L2 EML-CM c controller 160c. Each of the plurality of L3/L2 EML-CM controllers 160 might communicatively couple with a corresponding one of the plurality of L3/L2 flow domain controllers 150. Each L3/L2 EML-CM controller 160 might control one or more routers at the EL. For example, as shown in FIG. 1, the first L3/L2 EML-CM a controller 160a might control a first user-side provider edge ("U-PE") router 165a, while the second L3/L2 EML-CM b controller 160b might control two network-side provider edge ("N-PE") routers 170a and 170b, and the third L3/L2 EML-CM c controller 160c might control a second U-PE 165b. I-NNIs 155 might communicatively couple U-PE routers 165 with N-PE routers 170, and communicatively couple N-PE routers 170 to other N-PE routers 170.

In operation, a service request might be received by a GUI 110a, a web portal 110b, or a web service 110c. The service request might request performance of a service including, but is not limited to, service activation, service modification, service assurance, fault isolation, or performance monitoring, or the like. The MEF BML-CM controller 115 receives the service request and forwards to the MEF SML-CM controller 120, which then sends the service request to the MEF NML-CM controller 140 (via MEN 125). The MEF NML-CM controller 140 receives the service request, which might include information regarding the UNIs 130 and the EVC(s) 135 (e.g., vectors of the UNIs 130 and the EVC(s) 135, or the like), and might utilize a flow domain algorithm to generate flow domain information, which might be received and used by the L3/L2 flow domain controllers 150 to control the VLAN flow domains 145 and/or to send control information to the L3/L2 EML-CM controllers 160, which in turn controls the U-PEs 165 and/or N-Pes 170 at the element layer. Herein, the functions of the NML and the FDL (as well as interactions between the NML/FDL and the EML or EL) are described with respect to FIGS. 2-6 below.

Figure 2A:
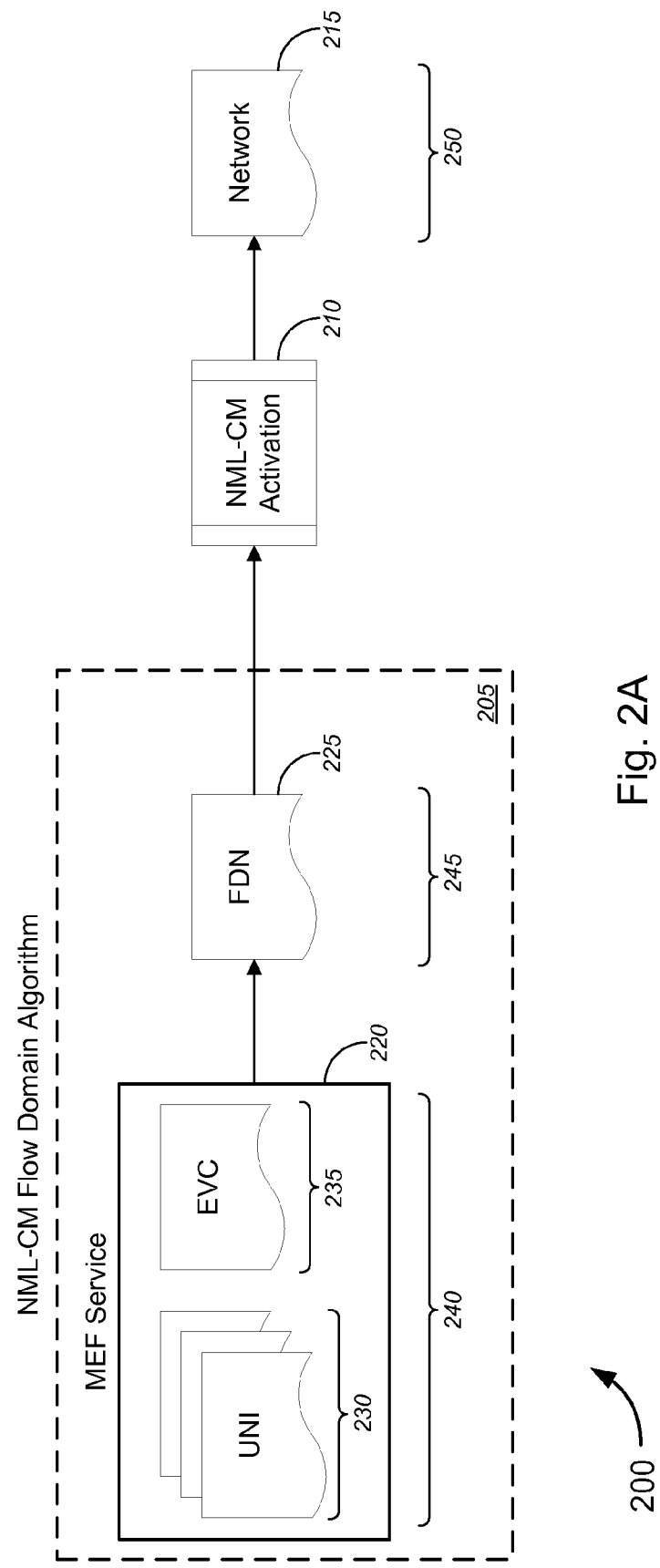
FIG. 2A is a block diagram illustrating a system depicting an exemplary NML-CM flow domain, in accordance with various embodiments.
Figure 2B:
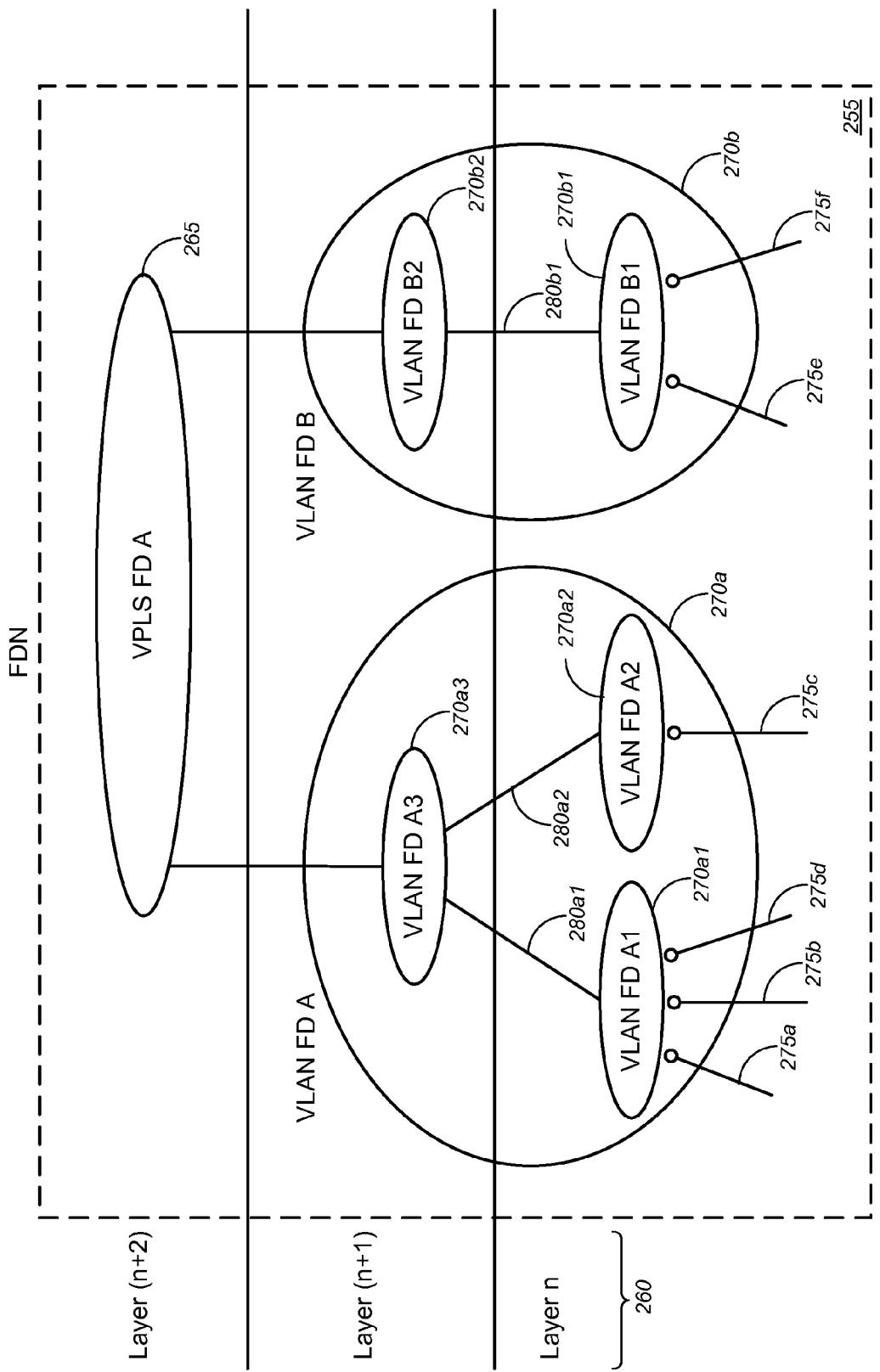
FIG. 2B is a block diagram illustrating an exemplary flow domain network ("FDN"), in accordance with various embodiments.

FIG. 2A is a block diagram illustrating a system 200 depicting an exemplary NML-CM flow domain, in accordance with various embodiments. FIG. 2B is a block diagram illustrating an exemplary flow domain network ("FDN") 225, in accordance with various embodiments.

In FIG. 2A, system 200, which represents a NML-CM flow domain, comprises a NML-CM flow domain algorithm 205 that generates flow domain information that is used by an NML-CM activation engine 210 to configure network 215. The flow domain information might be generated (or otherwise based on) a MEF service request 220, which might include information regarding two or more UNIs 230 and at least one EVC 235. In some cases, the information might comprise vectors or vector lists of each of the two or more UNIs 230 and the at least one EVC 235, and/or vector paths through some (if not all) of the two or more UNIs 230 and the at least one EVC 235, or the like.

In other words, service information (under the MEF standard) 240 is used by the algorithm 205 to generate network flow domain information 245, which is technology specific yet vendor independent (i.e., it doesn't matter what vendor is providing the network components or devices, rather it is the technology utilized in the network components or devices that is important, at this stage). The network flow domain information 245 is then used by the NML-CM activation engine 210 to configure the network devices and components 250, which may be technology specific and vendor dependent.

It should be appreciated that although a NML-CM activation engine 210 is used in this non-limiting example, any suitable client may be used (consistent with the teachings of the various embodiments) to utilize network flow domain information 245 to configure network devices and components 250 to perform a service arising from the MEF service request. In some embodiments, for example, the client (instead of the activation engine 210) might include one of a service modification engine, a service assurance, a fault isolation engine, a performance monitoring/optimization engine, and/or the like, to configure the network devices 250 to perform service modification, service assurance, fault isolation, performance monitoring/optimization, and/or the like, respectively.

In general, FIG. 2A illustrates a concept referred to as an "outside-in" approach or analysis, which takes the edge components of UNIs and initiates the process of determining how to connect the UNIs with the EVC in order to meet the service request. In some cases, the "outside-in" approach or analysis might include deriving a network computed graph, which, in some embodiments, might be embodied as a FDN object or flow domain information. FIG. 2B illustrates an example FDN, and a FDN object includes information describing or defining the FDN.

Turning to FIG. 2B, FDN 225 might comprise a plurality of layers 260 (denoted "Layer n," "Layer (n+1)," and "Layer (n+2)" in the non-limiting example of FIG. 2B). At Layer (n+2), FDN 225 might comprise a VPLS flow domain A 265. FDN 225 might further comprise a two or more VLAN flow domains 270 that might span one or more layers 260. In the embodiment of FIG. 2B, FDN 225 includes a first VLAN flow domain A 270a and a second VLAN flow domain B 270b, which each spans Layers n and (n+1). The first VLAN flow domain A 270a and the second VLAN flow domain B 270b might each comprise a plurality of VLAN flow domains. In the example of FIG. 2B, the first VLAN flow domain A 270a might comprise VLAN flow domain A1 270a1 and VLAN flow domain A2 270a2, both at Layer n, and might further comprise VLAN flow domain A3 270a3 at Layer (n+1). The second VLAN flow domain B 270b, as shown in FIG. 2B, might comprise VLAN flow domain B1 270b1 and VLAN flow domain B2 270b2, the former at Layer n and the latter at Layer (n+1). A plurality of connections 275 might communicatively couple a plurality of UNIs to the VLAN flow domains at Layer n. For example, as shown in FIG. 2B, each of connections 275a-275f might communicatively couple each of UNIs (e.g., UNI 1 through UNI 6 325, as shown in FIG. 3) to VLAN flow domain A1 270a1, VLAN flow domain A2 270a2, or VLAN flow domain B1 270b1. In some embodiments, one or more of connections 275 might utilize flexible port partitioning ("FPP") or the like, which might enable virtual Ethernet controllers to control partitioning of bandwidth across multiple virtual functions and/or to provide balanced quality of service ("QoS") by giving each assigned virtual function equal (or distributed) access to network bandwidth.

Figure 3A:
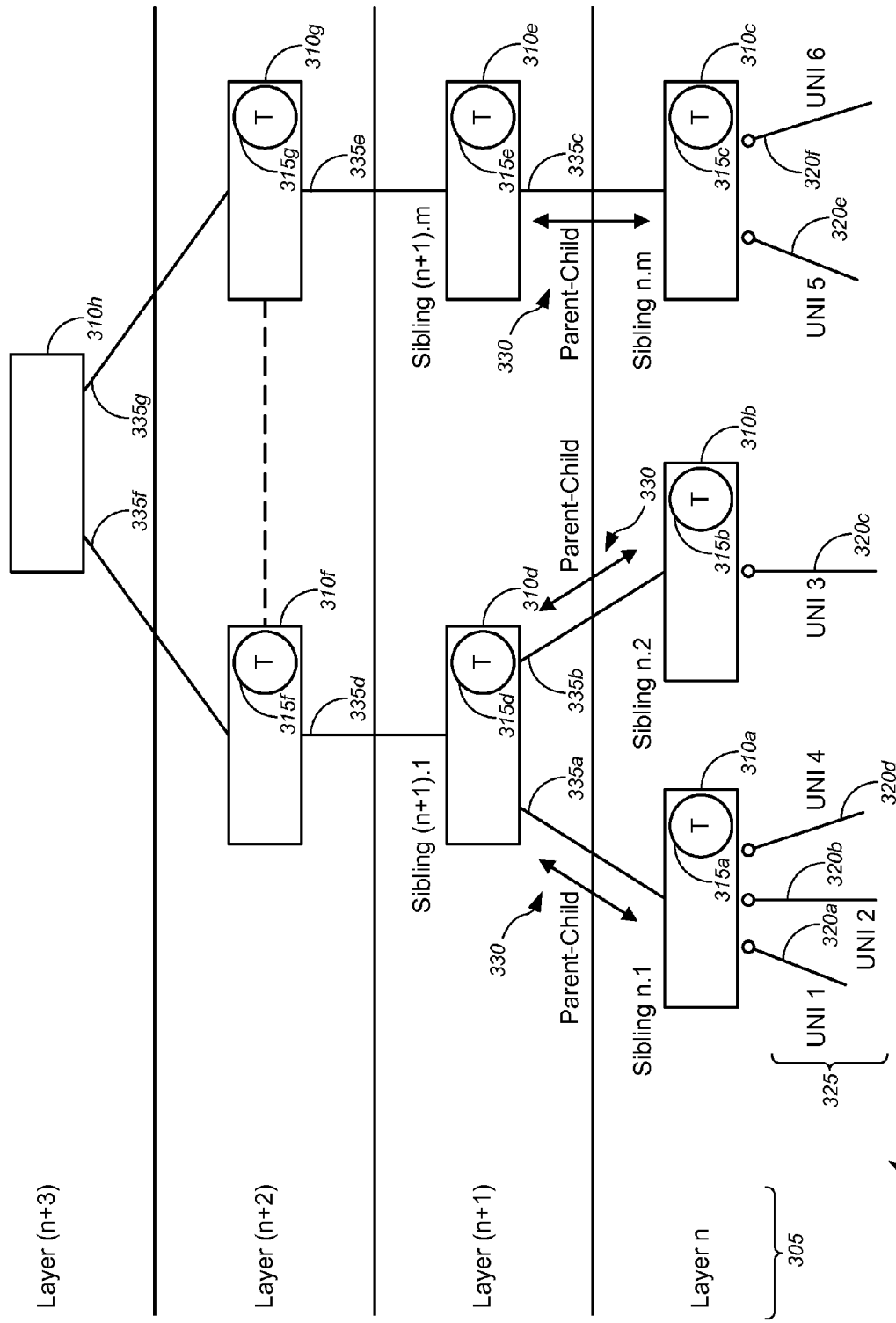
FIG. 3A is a block diagram illustrating exemplary FDN derivation, in accordance with various embodiments.

FIG. 3A-3C (collectively, "FIG. 3") are generally directed to FDN derivation, in accordance with various embodiments. In particular, FIG. 3A is a block diagram illustrating exemplary FDN derivation, in accordance with various embodiments. FIG. 3B is a block diagram illustrating exemplary layer n sibling check for FDN derivation, in accordance with various embodiments. FIG. 3C is a block diagram illustrating exemplary FDN derivation utilizing a set of bins each for grouping user network interfaces ("UNIs") that share the same edge serving device, in accordance with various embodiments.

In a flow domain analysis, the end result, given a MEF service (including two or more UNIs and at least one EVC, or the like), might, in some exemplary embodiments, include a FDN object. The FDN object might be used by a client device for various purposes, including, without limitation, service activation, service modification, fault isolation, performance monitoring, and/or the like. The FDN object might provide the intermediate abstraction between the service and the underlying network technology.

The node type is a requirement that is used to support flow domain analysis. An attribute associated with the node/device may be assigned. In some cases, the assignment should ideally be an inventoried attribute, but can, in some instances, be derived. The node type might be examined during the flow domain analysis and used to construct the flow domain network.

The overall logic might include a series of technology specific (yet vendor independent) flow analyses. The process might begin with a Nodal (i.e., MTU-s, which might refer to a provider edge router (or system thereof) for multi-dwelling units) flow domain analysis, and might follow with various supporting technology flow domains, including, without limitation, G.8032 Ethernet ring protection switching ("G.8032 ERPS"), Aggregation ("Agg" or "AGG"), hierarchical virtual private local area network service ("H-VPLS"), packet on a blade ("POB"), PE-rs served UNIs (herein, "PE-rs" or "PE_rs" might refer to a provider edge router having routing and switching functionality), multi-operator (including, but not limited to, external network-to-network interface ("E-NNI"), border gateway protocol-logical unit ("BGP-LU"), and/or the like), and/or virtual private LAN service ("VPLS"), or the like.

Each technology flow domain analysis might begin with the examination of a set of UNIs (e.g., Edge Flow Domain Analysis) that are part of the MEF service. A major function of the Edge Flow Domain Analysis is to take the MEF service request (including vector(s) of UNIs and EVCs), and then determining service devices.

The overall logic may be implemented using an outside-in analysis. Specifically, the UNI containment might be used to begin the analysis and determine the outside flow domains. The next step might be based on the devices serving the UNI work from the outside to the inside and determining attached flow domains. The flow domains shown in FIG. 3 include, but are not limited to, G.8032, H-VPLS, AGG, and/or the like.

With reference to FIG. 3A, system 300 might comprise a plurality of layers 305 (denoted "Layer n," "Layer (n+1)," "Layer (n+2)," and "Layer (n+3)"). At each layer, system 300 might include at least one network device 310. For example, as shown in the embodiment of FIG. 3A, at Layer n, system 300 might comprise M number of network devices—a first $n^{th}$ layer network device 310a, a second $n^{th}$ layer network device 310b, and through an $M^{th}$ $n^{th}$ layer network device 310c—each of which includes a G.8032 ring 315 or a PE_rs 315 (denoted 315a, 315b, and 315c, respectively). At Layer (n+1), system 300 might comprise a first $(n+1)^{th}$ layer network device 310d through an $M^{th}$ $(n+1)^{th}$ layer network device 310e—each of which includes a G.8032 ring 315 or a PE_rs 315 (denoted 315d and 315e, respectively). At Layer (n+2), system 300 might comprise a first $(n+2)^{th}$ layer network device 310f through an $M^{th}$ $(n+2)^{th}$ layer network device 310g—each of which includes a G.8032 ring 315 or a PE_rs 315 (denoted 315f and 315g, respectively). At Layer (n+3), method 300 might comprise a $(n+3)^{th}$ layer network device 310h, which may or may not include a G.8032 ring 315 or a PE_rs 315.

Each network device 310 may be referred to as a sibling to each other, classified by layers. For instance, with reference to the example shown in FIG. 3A, the first $n^{th}$ layer network device 310a might be denoted "Sibling n.1," the second $n^{th}$ layer network device 310b might be denoted "Sibling n.2," the $M^{th}$ $n^{th}$ layer network device 310c might be denoted "Sibling n.m." At Layer (n+1), the first $(n+1)^{th}$ layer network device 310d might be denoted "Sibling (n+1).1," while the $M^{th}$ $(n+1)^{th}$ layer network device 310e might be denoted "Sibling (n+1).m, or the like. And so on.

In some embodiments, each of the $n^{th}$ layer network devices 310a-310c might communicatively couple via connections 320 (including connections 320a-320f) to each of a plurality of UNIs 325 (including UNI 1 through UNI 6, as shown in FIG. 3A). The $(n+1)^{th}$ layer and $n^{th}$ layer network devices might have a parent-child relationship 330, and might communicatively couple to each other via connections 335 (including connections 335a, 335b, and 335c, as shown in FIG. 3A). As shown in the embodiment of FIG. 3A, Sibling n.1 might communicatively couple with Sibling (n+1).1 via connection 335a, while Sibling n.2 might communicatively couple with Sibling (n+1).1 via connection 335b, and Sibling n.m might communicatively couple with Sibling (n+1).m via connection 335c. Each of the $(n+1)^{th}$ layer network devices might communicatively couple with each of the corresponding $(n+2)^{th}$ layer network devices via connections 335d and 335e (i.e., network device 310d coupled with network device 310f via connection 335d, network device 310e coupled with network device 310g via connection 335e, as shown in the example of FIG. 3A). Each of the $(n+2)^{th}$ layer network devices 310f-310g might communicatively couple to the $(n+3)^{th}$ layer network device 310h via connections 335f-335g. In some embodiments, the network devices at Layer (n+2) might communicate with each other (as denoted by the dashed line in FIG. 3A).

In a FDN derivation, the process might begin with a sibling check at the edge or Layer n. In some embodiments, the sibling check might include determining whether a number of the siblings is greater than 1. Based on a determination that the number of the siblings is greater than 1, the process might proceed to Layer (n+1). The process might include performing a "T check," in which it is determined whether T equals G.8032 ring. If so, then ring members are added. The process might further include performing a flow domain change check, in which it is determined whether T=PE_rs. If T is a PE_rs, then the VLAN flow domain is done. At Layer n+1, another sibling check might be performed that includes determining whether a number of the siblings is greater than 1. Based on a determination that the number of the siblings is greater than 1, the process might proceed to Layer (n+2). The process might include performing a "T check," in which it is determined whether T equals G.8032 ring. If so, then ring members are added. The process might further include performing a flow domain change check, in which it is determined whether T=PE_rs. If T is a PE_rs, then the VLAN flow domain is done. In general, the process proceeds to the next layer (n+x) until the core technology (in this case, VPLS;

although the various embodiments are not so limited) is reached or until there are no more siblings at that layer.

FIG. 3B illustrates the $n^{th}$ layer of the FDN of FIG. 3A. FIG. 3C illustrates the steps for determining edge connecting technology. In some embodiments, the first process flow logic might determine the set of Intra-MTUs flow domains, given a set of UNIs. The Edge Flow Domain Analysis might be used to determine the UNI supporting devices. Second, the analysis might feed to the neighbor flow domain. Some technologies that support UNIs might include, without limitation, MTU-s, packet on a blade, PE-rs, H-VPLS, G.8032 remote terminal ("RT"), G.8032 central office terminal ("COT"), and/or the like.

The analysis that may be performed herein might examine the vector (set) of UNIs that are components of the MEF service (along with an EVC). The analysis might be an outside-in approach, whereby the network connectivity required to support the service is determined by examining the edge of the network and determining the connecting components inward (e.g., toward a core of the network).

In some cases, the UNI list might be examined and a set of bins might be created with each bin holding a subset of UNIs that share the same edge serving device. Once the set of bins is established, the underlying technology may be determined in order to identify the VLAN flow domain type for the edge.

With reference to FIG. 3C, the two steps for FDN derivation might include determining shared edge devices (Step 1, 340a) and determining the edge connecting technology (including, but not limited to, MTU-s, packet on a blade, PE-rs, H-VPLS, G.8032 RT, G.8032 COT, and/or the like) (Step 2, 340b). At Step 1 (340a), UNIs 325 or 350 that share the same edge serving device may be grouped within the same bin of a plurality of bins 345 (including a first bin 345a, a second bin 345b, and a third bin 345c, as shown in the non-limiting example of FIG. 3C). For example, in the embodiment of FIG. 3C, UNIs 1, 2, and 4 might be grouped in the first bin 345a, while UNI 3 might be placed in the second bin 345b, and UNIs 5 and 6 might be grouped in the third bin 345c. At Step 2 (340b), the underlying technology for the grouped UNIs (in the appropriate bins) may be determined in order to identify the VLAN flow domain type for the edge. In some embodiments, by grouping the UNIs by shared edge serving device, determination of the underlying network technology may be implemented by determining the underlying technology for each of the shared edge serving devices (each represented by a bin of the plurality of bins). In such as case, efficient determination may be performed with minimal duplicative determinations.

Figure 4:
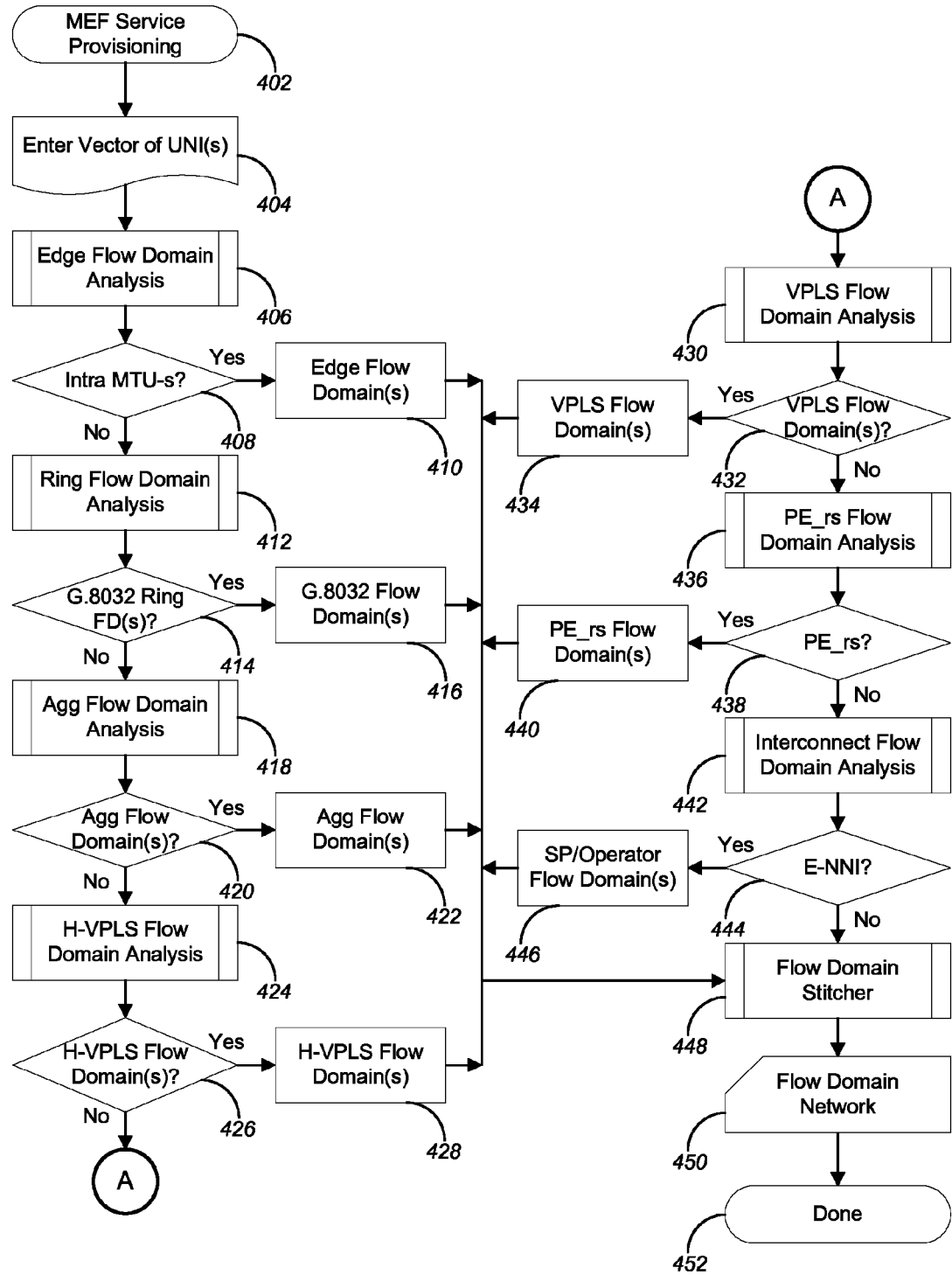
FIG. 4 is a flow diagram illustrating an exemplary method for generating a FDN object, in accordance with various embodiments.

FIG. 4 is a flow diagram illustrating an exemplary method 400 for generating a FDN object, in accordance with various embodiments. In particular, method 400 represents an implementation of an FDN algorithm using the outside-in approach, as referred to with respect to FIGS. 2 and 3 above. While the techniques and procedures of the method 400 is depicted and/or described in a certain order for purposes of illustration, it should be appreciated that certain procedures may be reordered and/or omitted within the scope of various embodiments. Moreover, while the method illustrated by FIG. 6 can be implemented by (and, in some cases, are described below with respect to) system 100 of FIG. 1 (or components thereof), or any of systems 200, 300, and 500 of FIGS. 2, 3, and 5 (or components thereof), respectively, the method may also be implemented using any suitable hardware implementation. Similarly, while systems 200, 300, and 500 (and/or components thereof) can operate according to the methods illustrated by FIG. 4 (e.g., by executing instructions embodied on a computer readable medium), systems 200, 300, and 500 can also operate according to other modes of operation and/or perform other suitable procedures.

With reference to FIG. 4, method 400 might comprise initiating MEF service provisioning (block 402). In some cases, initiating MEF service provisioning might comprise receiving a service request, which might originate from a first client device over a network (in some cases, via a UNI). At block 404, method 400 might comprise entering a vector of UNI(s). In some embodiments, entering a vector of UNI(s) might comprise determining one or more network devices for implementing a service arising from the service request. In some cases, the vector of UNI(s) might be included in, or derived from, the service request.

Method 400, at block 406, might comprise performing, with the first network device, an edge flow domain analysis and, at block 408, might comprise determining, with the first network device, whether at least one of the one or more second network devices is included in a flow domain comprising an intra-provider edge router system for multi-dwelling units ("intra-MTU-s"), based on the edge flow domain analysis. Method 400 might further comprise, based on a determination that at least one of the one or more second network devices is included in a flow domain comprising an intra-MTU-s, determining, with the first network device, one or more edge flow domains (block 410) and, based on a determination that at least one of the one or more second network devices does not include a flow domain comprising an intra-MTU-s, performing, with the first network device, a ring flow domain analysis (block 412). At block 414, method 400 might comprise determining, with the first network device, whether at least one of the one or more second network devices is included in one or more G.8032 ring flow domains, based on the ring flow domain analysis. Method 400, at block 416, might comprise, based on a determination that at least one of the one or more second network devices is included in one or more G.8032 ring flow domains, determining, with the first network device, the one or more G.8032 flow domains. At block 418, method 400 might comprise, based on a determination that at least one of the one or more second network devices is not included in one or more G.8032 ring flow domains, performing, with the first network device, an aggregate ("AGG") flow domain analysis. Method 400 might further comprise, at block 420, determining, with the first network device, whether at least one of the one or more second network devices is included in one or more aggregate flow domains, based on the aggregate flow domain analysis. Method 400 might further comprise, based on a determination that at least one of the one or more second network devices is included in one or more aggregate flow domains, determining, with the first network device, the one or more aggregate flow domains (block 422) and, based on a determination that at least one of the one or more second network devices is not included in one or more aggregate flow domains, performing, with the first network device, a hierarchical virtual private local area network service ("H-VPLS") flow domain analysis (block 424).

At block 426, method 400 might comprise determining, with the first network device, whether at least one of the one or more second network devices is included in one or more H-VPLS flow domains, based on the H-VPLS flow domain analysis. Method 400, at block 428, might comprise based on a determination that at least one of the one or more second network devices is included in one or more H-VPLS flow domains, determining, with the first network device, the one or more one or more H-VPLS flow domains. Based on a determination that at least one of the one or more second network devices is not included in one or more H-VPLS flow domains, method 400 might follow marker "A" to block 430, at which method 400 might comprise performing, with the first network device, a virtual private local area network service ("VPLS") flow domain analysis. At block 432, method 400 might comprise determining, with the first network device, whether at least one of the one or more second network devices is included in one or more VPLS flow domains, based on the VPLS flow domain analysis. Method 400 might further comprise, based on a determination that at least one of the one or more second network devices is included in one or more VPLS flow domains, determining, with the first network device, the one or more VPLS flow domains (block 434) and, based on a determination that at least one of the one or more second network devices is not included in one or more VPLS flow domains, performing, with the first network device, a flow domain analysis for a provider edge having routing and switching functionality ("PE_rs flow domain analysis") (block 436).

Method 400, at block 438, might comprise determining, with the first network device, whether at least one of the one or more second network devices is included in a flow domain comprising one or more PE_rs, based on the PE_rs flow domain analysis. At block 440, method 400 might comprise, based on a determination that at least one of the one or more second network devices is included in a flow domain comprising one or more PE_rs, determining, with the first network device, one or more PE_rs flow domains. Method 400 might further comprise, at block 442, based on a determination that at least one of the one or more second network devices is not included in a flow domain comprising one or more PE_rs, performing, with the first network device, an interconnect flow domain analysis. Method 400, at block 444, might comprise determining, with the first network device, whether at least one of the one or more second network devices is included in a flow domain comprising an external network-to-network interface ("E-NNP"). Method 400 might further comprise, based on the interconnect flow domain analysis, and based on a determination that at least one of the one or more second network devices is included in a flow domain comprising an E-NNI, determining, with the first network device, one or more service provider or operator flow domains (block 446). Otherwise, method 400 proceeds to block 448.

In some embodiments, following the determinations of the flow domains—including, e.g., the one or more edge flow domains (at block 410), the one or more G.8032 ring flow domains (at block 416), the one or more AGG flow domains (at block 422), the one or more H-VPLS flow domains (at block 428), the one or more VPLS flow domains (at block 434), the one or more PE_rs flow domains (at block 440), and/or the one or more service provider/operator flow domains (at block 446)—the processes of method 400 proceed to block 448. At block 448, method 400 might comprise stitching, with the first network device, at least one of the determined one or more edge flow domains, the determined one or more G.8032 flow domains, the determined one or more aggregate flow domains, the determined one or more one or more H-VPLS flow domains, the determined one or more VPLS flow domains, the determined one or more PE_rs flow domains, and/or the determined one or more service provider or operator flow domains, or the like, to generate flow domain information indicating a flow domain network ("FDN") or to generate an FDN object or the like (block 450). The process then concludes at block 452. As discussed herein, the flow domain information or FDN object may be used to configure at least one of one or more second network devices to perform a service arising from the service request, the service including, but not limited to, service activation, service modification, service assurance, fault isolation, and/or performance monitoring, or the like.

In some embodiments, the service request might be initiated by the client northbound from the NML-CM system. The NML-CM system may be responsible for decomposing the set of service attributes. The FDN result might be used to determine the underlying element management systems that support each flow domain. The set of requests for activation to each element management system might be transmitted based on the decomposition of the service request into a FDN and FDN into segments. The examples shown in FIGS. 5A-5I (collectively, "FIG. 5") provide technology specific use cases for VPLS and VLAN flow domains under various topology configurations, in accordance with various embodiments. Although specific network configurations are shown in FIG. 5, such configurations are merely illustrative and non-limiting, and the various embodiments any suitable network configurations having similar flow domains.

Figure 5A:
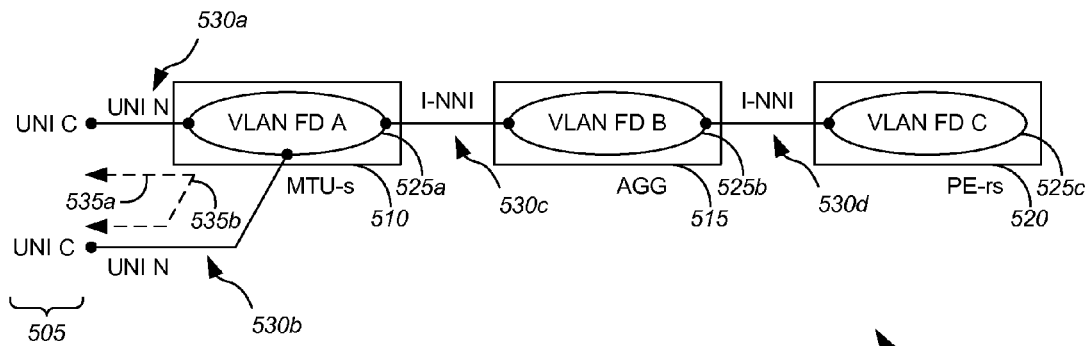
FIGS. 5A-5I are block diagrams illustrating various exemplary flow domains, in accordance with various embodiments.

In FIG. 5A, which represents an example of a flow domain having two UNI Intra-MTU-s to AGG to PE-rs, system 500 comprises two user-side UNIs 505, an MTU-s 510, an AGG 515, and a PE-rs 520. The MTU-s 510 comprises VLAN flow domain A 525a, while the AGG 515 comprises VLAN flow domain B 525b, and the PE-rs 520 comprises VLAN flow domain C 525c. A first user-side UNI ("UNI-C") 505 has a corresponding network-side UNI ("UNI-N") 530a, while a second user-side UNI ("UNI-C") 505 has a corresponding network-side UNI ("UNI-N") 530b. The UNI-Ns 530a and 530b communicatively couple the UNI-Cs 505 to VLAN flow domain A 525a. A first internal network-to-network interface ("I-NNP") 530c communicatively couples VLAN flow domain A 525a with VLAN flow domain B 525b, while a second I-NNI 530d communicatively couples VLAN flow domain B 525b with VLAN flow domain C 525c. Dashed arrows 535a and 535b (collectively, "flow paths 535") represent flow paths, in this case, from VLAN flow domain A 525a to each UNI-C 505.

As shown in the embodiment of FIG. 5A, the two UNI single Intra MTU-s flow domain use case has a bridged VLAN flow domain with UNIs connected to bridged flow domain. In this case, only two UNIs are defined and are connected to the same MTU-s. A derivative of this option is to configure the MTU-s VLAN flow domain as a cross-connection.

Figure 5B:
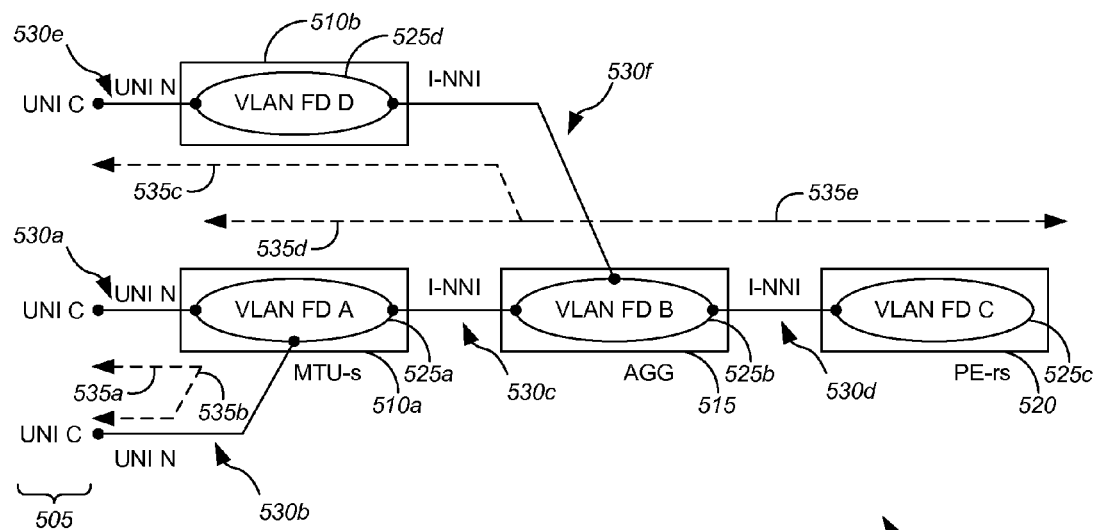

In FIG. 5B, which represents an Intra AGG to PE-rs flow domain, system 500 is similar to system 500 as shown in FIG. 5A (and thus descriptions in FIG. 5A similarly apply to corresponding or similar components in FIG. 5B), except that system 500 in FIG. 5B further comprises a second MTU-s 510b comprising VLAN flow domain D 525d. In this example, a third UNI-C 505 has a corresponding UNI-N 530e that communicatively couples to VLAN flow domain D 525d. A third I-NNI 530f communicatively couples VLAN flow domain D 525d with VLAN flow domain B 525b. Flow path 535c represents a flow path from VLAN flow domain B 525b, via VLAN flow domain D 525d and the third UNI-N 530e, to the third UNI-C 505. Flow path 535d represents a flow path from VLAN flow domain B 525b to VLAN flow domain A 525a, while flow path 535e (denoted by a long dash and a double dash) represents a flow path from VLAN flow domain B 525b to VLAN flow domain C 525c.

In the embodiment of FIG. 5B, the Intra AGG flow domain has multiple MTU-s devices served by a single AGG device. MTU-s VLAN bridged flow domains are configured on each MTU-s. The individual I-NNIs are connected to the AGG bridged VLAN flow domain. Additional UNIs configured via the PE-rs must be accounted for. If additional UNIs that traverse a second PE-rs is required, then the PE-rs bridge flow domain is associated with a VPLS flow domain.

Figure 5C:
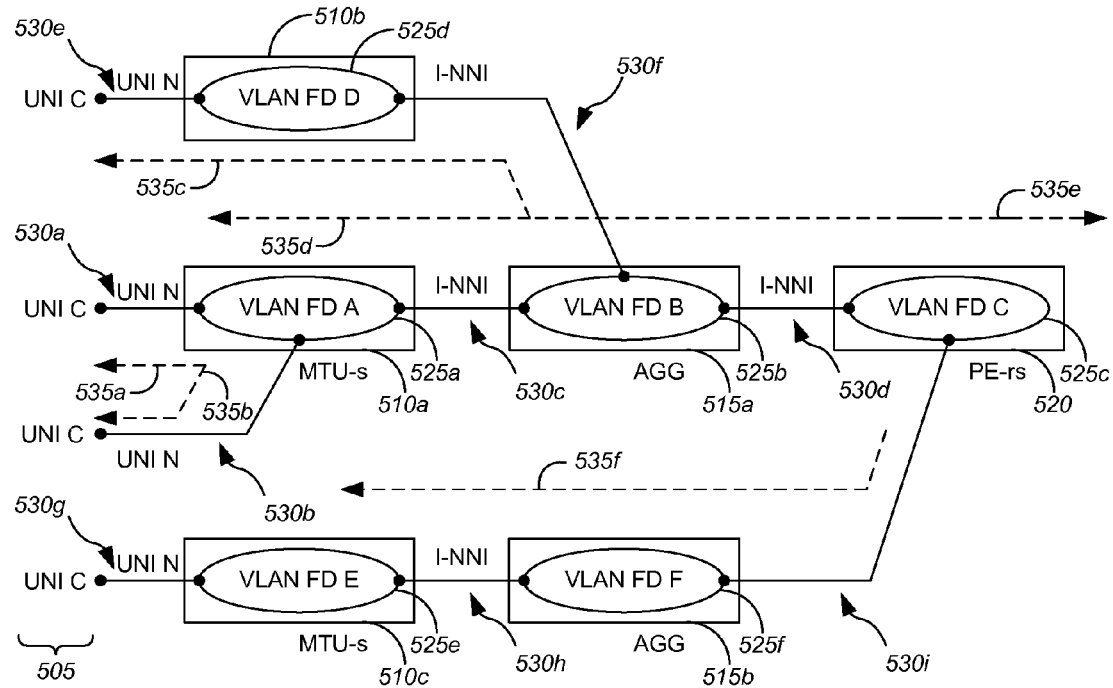

In FIG. 5C, which represents an Intra PE-rs/Multiple AGG to PE-rs flow domain, system 500 is similar to system 500 as shown in FIG. 5B (and thus descriptions in FIG. 5B similarly apply to corresponding or similar components in FIG. 5C), except that system 500 in FIG. 5C further comprises a third MTU-s 510c comprising VLAN flow domain E 525e and a second AGG 515b comprising VLAN flow domain F 525f. In this example, a fourth UNI-C 505 has a corresponding UNI-N 530g that communicatively couples to VLAN flow domain E 525e. A fourth I-NNI 530h communicatively couples VLAN flow domain E 525e with VLAN flow domain F 525f, while a fifth I-NNI 530i communicatively couples VLAN flow domain F 525f to VLAN flow domain C 525c. Here, flow path 535d represents a flow path from VLAN flow domain C 525c to VLAN flow domain A 525a, while flow path 535e (denoted by a long dash and a double dash) represents a flow path from VLAN flow domain C 525c to another VLAN flow domain (not shown). Flow path 535f represents a flow path from VLAN flow domain C 525c, via VLAN flow domain E 525e, VLAN flow domain F 525f, fourth I-NNI 530h, fifth I-NNI 530i, and fourth UNI-N 530g, to the fourth UNI-C 505.

In the example of FIG. 5C, the Intra PE-rs/Multiple AGG flow domain has one or more MTU-s devices with VLAN bridged or cross-connection flow domains. Each I-NNI from the MTU-s is connected to a VLAN bridged AGG flow domain. Multiple AGG devices are connected with I-NNIs to a common PE-rs VLAN bridged flow domain. If additional UNIs that traverse a second PE-rs are required, then the PE-rs bridge flow domain is associated with a VPLS flow domain.

Figure 5D:
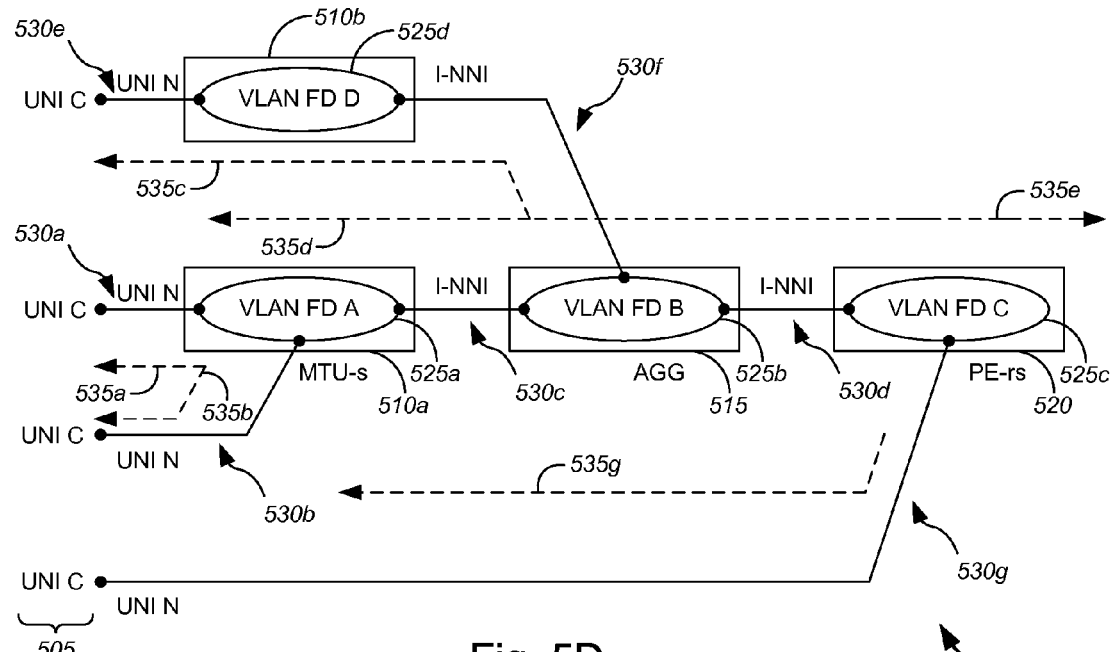

In FIG. 5D, which represents an Intra PE-rs with UNI/AGG flow domain, system 500 is similar to system 500 as shown in FIG. 5B (and thus descriptions in FIG. 5B similarly apply to corresponding or similar components in FIG. 5D), except that system 500 in FIG. 5D further comprises a fourth UNI-C 505 having a corresponding fourth LINI-N 530g communicatively coupling the fourth UNI-C 505 to VLAN flow domain C 525c. Flow path 535g represents a flow path from VLAN flow domain C 525c to the fourth UNI-C 505 via the fourth UNI-N 530g.

As shown in the embodiment of FIG. 5D, the Intra PE-rs with UNI/AGG flow domain is a use case where the PE-rs in addition to serving AGG connections is providing UNI service. The PE-rs is configured with a VLAN bridged flow domain and associates the I-NNI(s) from AGG devices and all serving UNIs.

Figure 5E:
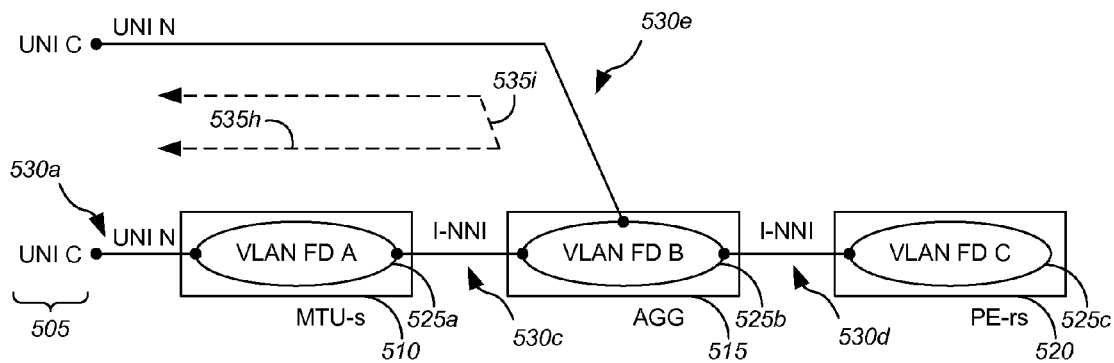

In FIG. 5E, which represents an Intra-AGG/AGG UNI flow domain, system 500 comprises a first UNI-C 505, an MTU-s 510, an AGG 515, and a PE-rs 520. The MTU-s 510 comprises VLAN flow domain A 525a, while the AGG 515 comprises VLAN flow domain B 525b, and the PE-rs 520 comprises VLAN flow domain C 525c. The first UNI-C 505 has a corresponding UNI-N 530a, which communicatively couples the first UNI-C 505 to VLAN flow domain A 525a. A first I-NNI 530c communicatively couples VLAN flow domain A 525a with VLAN flow domain B 525b, while a second I-NNI 530d communicatively couples VLAN flow domain B 525b with VLAN flow domain C 525c. In this case, another UNI-C 505 has a corresponding UNI-N 530e that communicatively couples to VLAN flow domain B 525b. Flow path 535h represents a flow path from VLAN flow domain B 525b, via VLAN flow domain A 525a, UNI-N 530a, and I-NNI 530c, to the first UNI-C 505. Flow path 535i represents a flow path from VLAN flow domain B 525b, via UNI-N 530e, to the other UNI-C 505.

In the example shown in FIG. 5E, the Intra-AGG UNI flow domain use case is also referred to as a packet on a blade ("POB"). In this use case, the AGG device is serving one or more MTU-s devices and one or more UNIs.

The remainder of FIG. 5 shows examples of logic that may be necessary to determine if the underlying technology provides G.8032 ERPS network flow domain. A G.8032 ring VLAN flow domain must have the VLAN assignment across all remote terminals ("RTs") and central office terminals ("COTs") within a ring. This is a requirement for diversity in failure conditions. The following provides the necessary logic to determine whether the underlying technology provides VPLS network flow domain. In order for a VPLS flow domain to be required, more than one PE-rs is required to fulfill the service activation request.

Figure 5F:
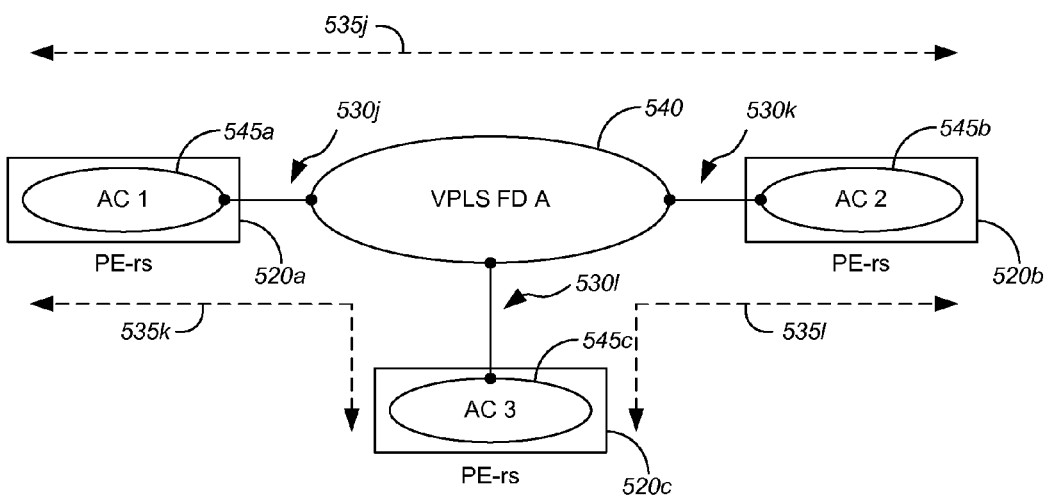

In FIG. 5F, in which an example of VPLS flow domain is shown, system 500 might comprise a first PE-rs 520a, a second PE-rs 520b, and a third PE-rs 520c. The first PE-rs 520a might comprise a first access concentrator ("AC 1") 545a, while the second PE-rs 520b might comprise a second AC ("AC 2") 545b, and the third PE-rs 520c might comprise a third AC ("AC 3") 545c. System 500 might further comprise a VPLS flow domain A 540 that communicatively couples each of AC 1 545a, AC 2 545b, and AC 3 545c via connections 530j, 530k, and 530l, respectively. In some embodiments, each of connections 530j, 530k, and 530l might include an I-NNI connection, as described in detail above. Here, flow path 535j represents a flow path from/to AC 1 545a to/from AC 2 545b, via VPLS flow domain A 540 and connections 530j and 530k. Flow path 535k represents a flow path from/to AC 1 545a to/from AC 3 545c, via VPLS flow domain A 540 and connections 530j and 530l. Flow path 535l represents a flow path from/to AC 2 545b to/from AC 3 545c, via VPLS flow domain A 540 and connections 530k and 530l.

Figure 5G:
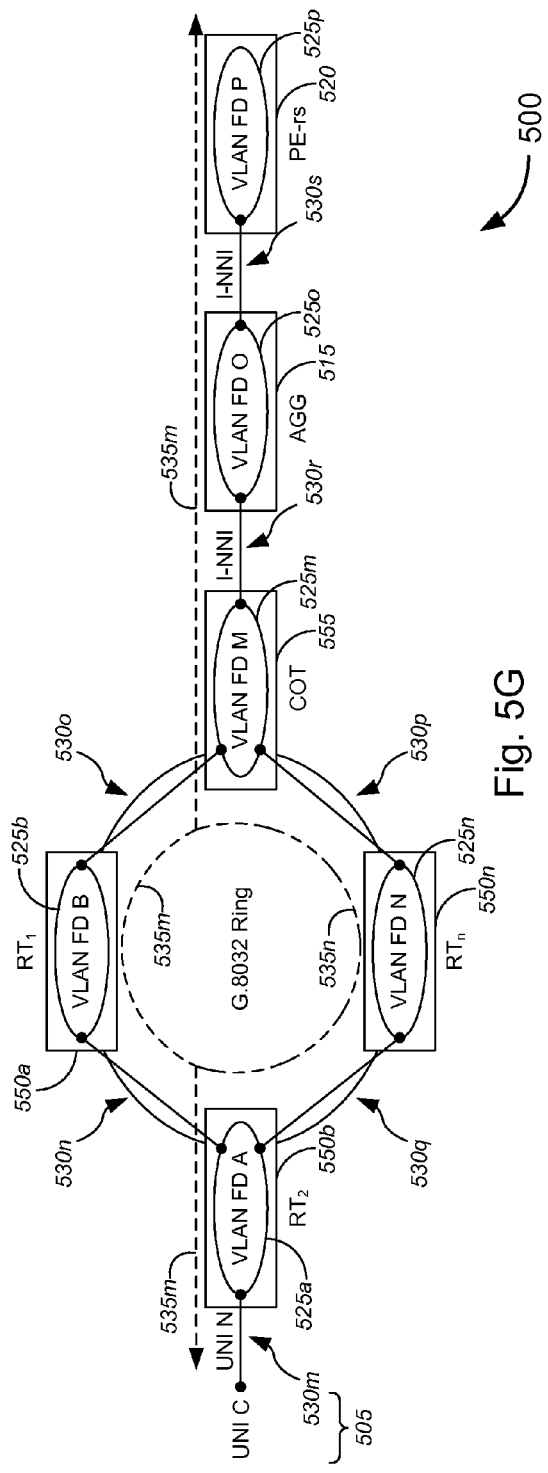

In FIG. 5G, which represents a G.8032 single UNI on RT to AGG to PE-rs flow domain, system 500 might comprise a first UNI-C 505, a first RT ("$RT_1$") 550a, a second RT ("$RT_2$") 550b, an $N^{th}$ RT ("$RT_n$") 550n, a COT 555, an AGG 515, and a PE-rs 520. $RT_2$ 550b might comprise VLAN flow domain A 525a, while $RT_1$ 550a might comprise VLAN flow domain B 525b, and $RT_n$ 550n might comprise VLAN flow domain N 525n. COT 555 might comprise VLAN flow domain M 525m, while AGG 515 might comprise VLAN flow domain O 525o, and PE-rs might comprise VLAN flow domain p 525p. The first UNI-C 505 might have a corresponding UNI-N 530m that communicatively couples to VLAN flow domain A 525a. I-NNI 530n communicatively couples VLAN flow domain A 525a to VLAN flow domain B 525b. I-NNI 530o communicatively couples VLAN flow domain B 525b to VLAN flow domain M 525m. I-NNI 530p communicatively couples VLAN flow domain M 525m to VLAN flow domain N 525n. I-NNI 530q communicatively couples VLAN flow domain N 525n to VLAN flow domain A 525a. $RT_1$ 550a, $RT_2$ 550b, $RT_n$ 550n, and COT 555 define a G.8032 ring. In other words, connection of VLAN flow domain A 525a, VLAN flow domain B 525b, VLAN flow domain M 525m, and VLAN flow domain N 525n (i.e., via I-NNIs 530n, 530o, 530p, and 530q, respectively) define the G.8032 ring. I-NNI 530r communicatively couples VLAN flow domain M 525m to VLAN flow domain O 525o, while I-NNI 530s communicatively couples VLAN flow domain O 525o to VLAN flow domain P 525p. Flow path 535m represents a flow path from/to UNI-C 505 to/from PE-rs 520, via UNI-N 530m, VLAN flow domain A 525a, I-NNI 530n, VLAN flow domain B 525b, I-NNI 530o, VLAN flow domain M 525m, I-NNI 530r, VLAN flow domain O 525o, I-NNI 530s, and VLAN flow domain P 525p. Flow path 535n (denoted by a long dash and a double dash)

represents a flow path from/to VLAN flow domain A 525*a* to/from VLAN flow domain M 525*m*, via VLAN flow domain N 525*n* and I-NNIs 530*q* and 530*p*.

In the embodiment of FIG. 5G, the G.8032 single UNI on RT to AGG to PE-rs flow domain use case requires a VLAN bridged flow domain to be configured on the serving RT. The G.8032 ring members including COT must be configured with VLAN bridge or cross-connection flow domain. The COT is connected with G.8032 I-NNIs to RT ring members and upstream AGG device. The I-NNIs are associated with a COT VLAN flow domain. The AGG device is configured with a VLAN bridged or cross-connection VLAN flow domain. The AGG upstream and downstream I-NNIs are associated with the VLAN bridged or cross-connection flow domain. A VLAN bridged or cross-connection flow domain is configured on the PE-rs. In this use case, it is assumed that additional UNIs are served from a non-common PE-rs. Further flow domain analysis may connect to VPLS flow domain and corresponding flow domains.

Figure 5H:
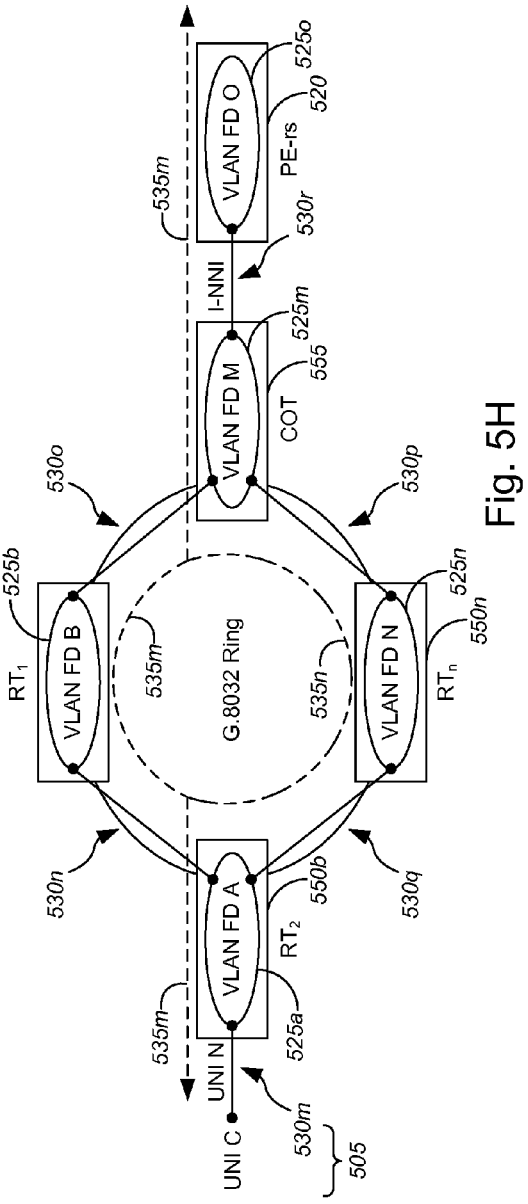

In FIG. 5H, which represents a G.8032 single UNI on RT to PE-rs flow domain, system 500 is similar to system 500 as shown in FIG. 5G (and thus descriptions in FIG. 5G similarly apply to corresponding or similar components in FIG. 5H), except that system 500 in FIG. 5H omits AGG 515. In FIG. 5H, PE-rs 520 comprises VLAN flow domain O 525*o*, and I-NNI 530*r* communicatively couples VLAN flow domain M 525*m* to VLAN flow domain O 525*o*. The embodiment of FIG. 5H is otherwise similar, or identical, to that of FIG. 5G.

In the example shown in FIG. 5H, the G.8032 single UNI on RT to PE-rs requires a single VLAN bridged flow domain to be configured on the serving RT.

Figure 5I:
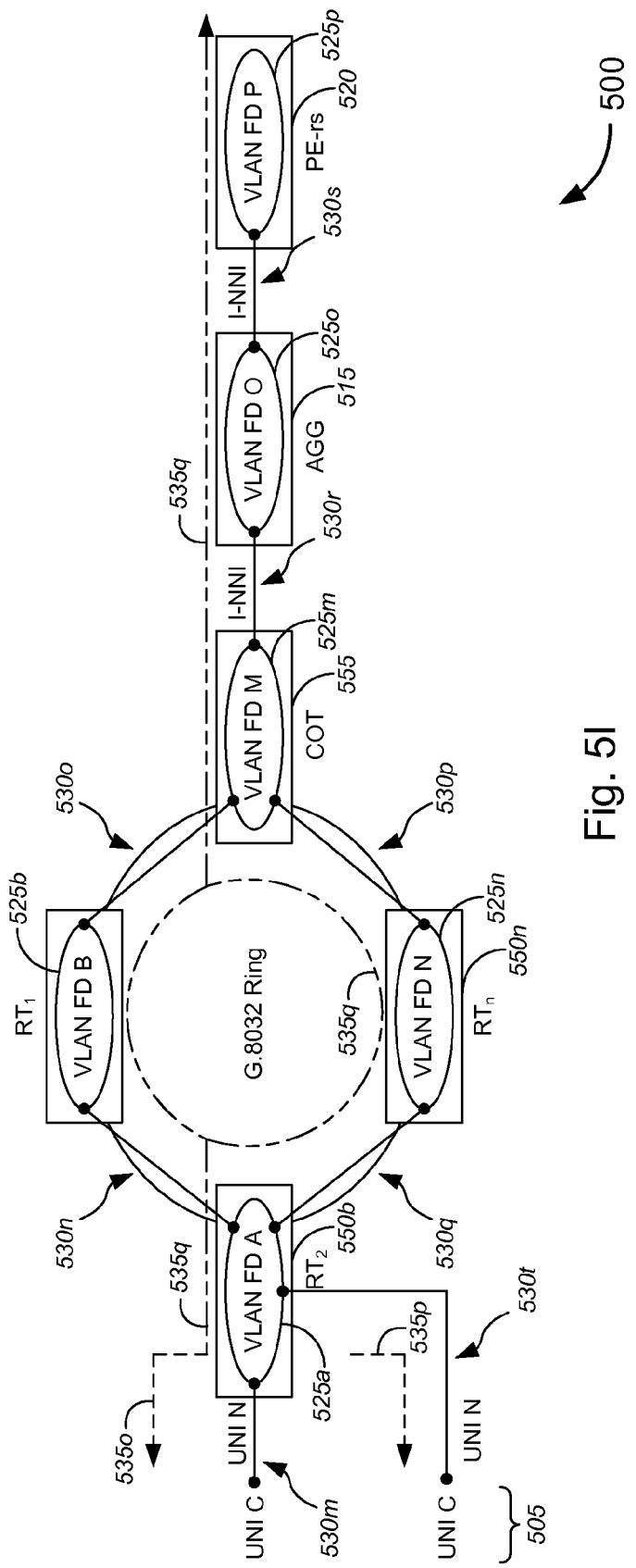

In FIG. 5I, which represents a G.8032 Intra RT flow domain, system 500 is similar to system 500 as shown in FIG. 5G (and thus descriptions in FIG. 5G similarly apply to corresponding or similar components in FIG. 5I), except that system 500 in FIG. 5I further comprises a second UNI-C 505. The two UNI-Cs 505 have corresponding UNI-Ns 530*m* and 530*t* that each communicatively couples a UNI-C 505 to VLAN flow domain A 525*a*. Flow path 535*o* represents a flow path from VLAN flow domain A 525*a* to UNI-C 505, via UNI-N 530*m*, while flow path 535*p* represents a flow path from VLAN flow domain A 525*a* to UNI-C 505, via UNI-N 530*t*. Flow path 535*q* (denoted by a long dash and a double dash) represents a flow path from/to VLAN flow domain A 525*a* to VLAN flow domain P 525*p*, via G.8032 ring (i.e., VLAN flow domain A 525*a*, VLAN flow domain B 525*b*, VLAN flow domain M 525*m*, VLAN flow domain N 525*n*, and I-NNIs 530*n*, 530*o*, 530*p*, and 530*q*), VLAN flow domain M 525*m*, VLAN flow domain O 525*o*, VLAN flow domain P 525*p*, and I-NNIs 530*r* and 530*s*. The embodiment of FIG. 5I is otherwise similar, or identical, to that of FIG. 5G.

In some embodiments with respect to FIG. 5, I-NNIs 530 might allow for a technique referred to as provider bridging, in which stacked VLANs (denoted "QinQ," "Q-in-Q," or "Q in Q") may be implemented, as provided under IEEE 802.1ad.

Figure 6:
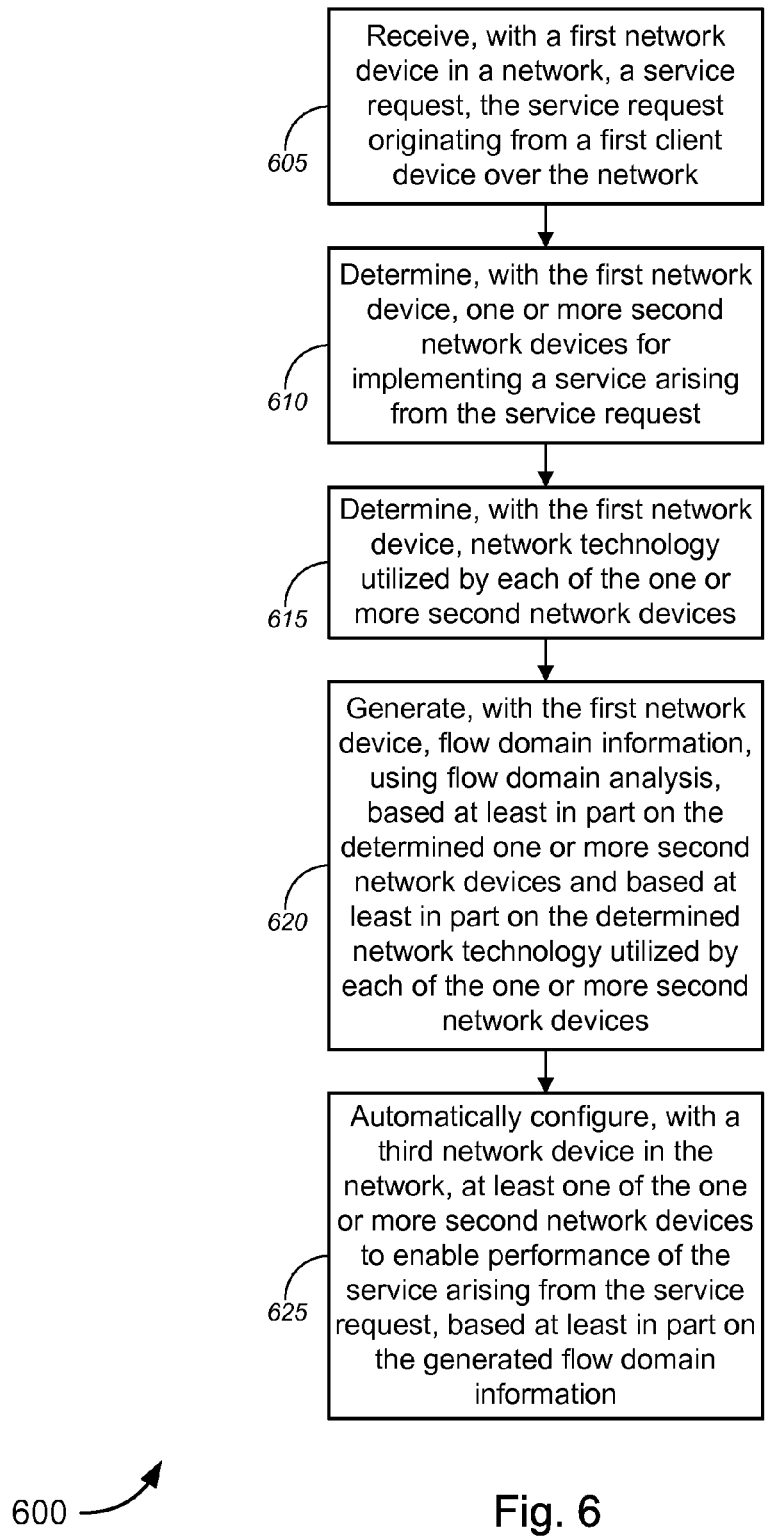
FIG. 6 is a flow diagram illustrating a method for generating flow domain information and implementing automatic configuration of network devices based on the generated flow domain information, in accordance with various embodiments.

We now turn to FIG. 6, which is directed to method 600 for generating flow domain information and implementing automatic configuration of network devices based on the generated flow domain information, in accordance with various embodiments. While the techniques and procedures of the method 600 is depicted and/or described in a certain order for purposes of illustration, it should be appreciated that certain procedures may be reordered and/or omitted within the scope of various embodiments. Moreover, while the method illustrated by FIG. 6 can be implemented by (and, in some cases, are described below with respect to) system 100 of FIG. 1 (or components thereof), or any of systems 200, 300, and 500 of FIGS. 2, 3, and 5 (or components thereof), respectively, the method may also be implemented using any suitable hardware implementation. Similarly, while systems 200, 300, and 500 (and/or components thereof) can operate according to the methods illustrated by FIG. 6 (e.g., by executing instructions embodied on a computer readable medium), systems 200, 300, and 500 can also operate according to other modes of operation and/or perform other suitable procedures.

In FIG. 6, method 600 might comprise receiving, with a first network device in a network, a service request, the service request originating from a first client device over the network (block 605). In some embodiments, the first network device might include, without limitation, a network management layer-configuration management ("NML-CM") controller or a layer 3/layer 2 flow domain ("L3/L2 FD") controller, or the like.

In some cases, the network might be a metro Ethernet network. In alternative embodiments, the network may be any suitable network including, but not limited to, a local area network ("LAN"), including without limitation a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

At block 610, method 600 might comprise determining, with the first network device, one or more second network devices for implementing a service arising from the service request. According to some embodiments, each of the one or more second network devices might comprise one of a U-PE router, a N-PE router, and/or an I-NNI device, or the like. In some cases, the service arising from the service request might comprise at least one of service activation, service modification, service assurance, fault isolation, and/or performance monitoring, or the like.

Method 600 might further comprise, at block 615, determining, with the first network device, network technology utilized by each of the one or more second network devices. In some embodiments, network technology might include, without limitation, one or more of G.8032 ERPS technology, aggregation technology, H-VPLS technology, POB technology, PE_rs-served UNI technology, multi-operator technology, or VPLS technology, and/or the like.

In some embodiments, the service request might be a Metro Ethernet Forum ("MEF") service request. Determining, with the first network device, network technology utilized by each of the one or more second network devices (at block 615) might comprise mapping, with the first network device, MEF services associated with the service request with the network technology utilized by each of the one or more second network devices. In some instances, mapping, with the first network device, MEF services associated with the service request with the network technology utilized by each of the one or more second network devices might comprise implementing, with the first network device, an intermediate abstraction between the MEF services and the network technology utilized by each of the one or more second network devices, using a layer network domain. According to some embodiments, the MEF service request might comprise vectors of at least two user network interfaces ("UNIs") and at least one Ethernet virtual circuit ("EVC").

Method 600, at block 620, might comprise generating, with the first network device, flow domain information, using flow domain analysis, based at least in part on the determined one or more second network devices and based at least in part on the determined network technology utilized by each of the one or more second network devices. In some embodiments, generating flow domain information, using flow domain analysis might comprise generating a flow domain network ("FDN") object, using flow domain analysis. In some cases, generating a FDN object might comprise generating a computed graph of flow domains indicating one or more network paths in the network through the one or more second network devices and indicating relevant connectivity associations of the one or more second network devices. In some instances, generating a FDN object might comprise utilizing an outside-in analysis that first analyzes relevant user network interfaces (as shown, e.g., with respect to FIGS. 2A, 3B, 3C, and 4).

At block 625, method 600 might comprise automatically configuring, with a third network device in the network, at least one of the one or more second network devices to enable performance of the service arising from the service request, based at least in part on the generated flow domain information. In some embodiments, the third network device might include, without limitation, one of a layer 3/layer 2 element management layer-configuration management ("L3/L2 EML-CM") controller, a NML-CM activation engine, a NML-CM modification engine, a service assurance engine, a fault isolation engine, or a performance monitoring engine, and/or the like. In some cases, the first network device and the third network device might be the same network device.

According to some embodiments, the third network device might receive the flow domain information from the first network device, and might automatically configure the at least one of the one or more second network devices to enable performance of the service arising from the service request, by sending configuration instructions to the at least one of the one or more second network devices. The at least one of the one or more second network devices might receive the configuration instructions from the third network device, and might change network configuration settings (i.e., network configuration settings internal to each of the at least one of the one or more second network devices that receives the configuration instructions), based on the configuration instructions.

Figure 7:
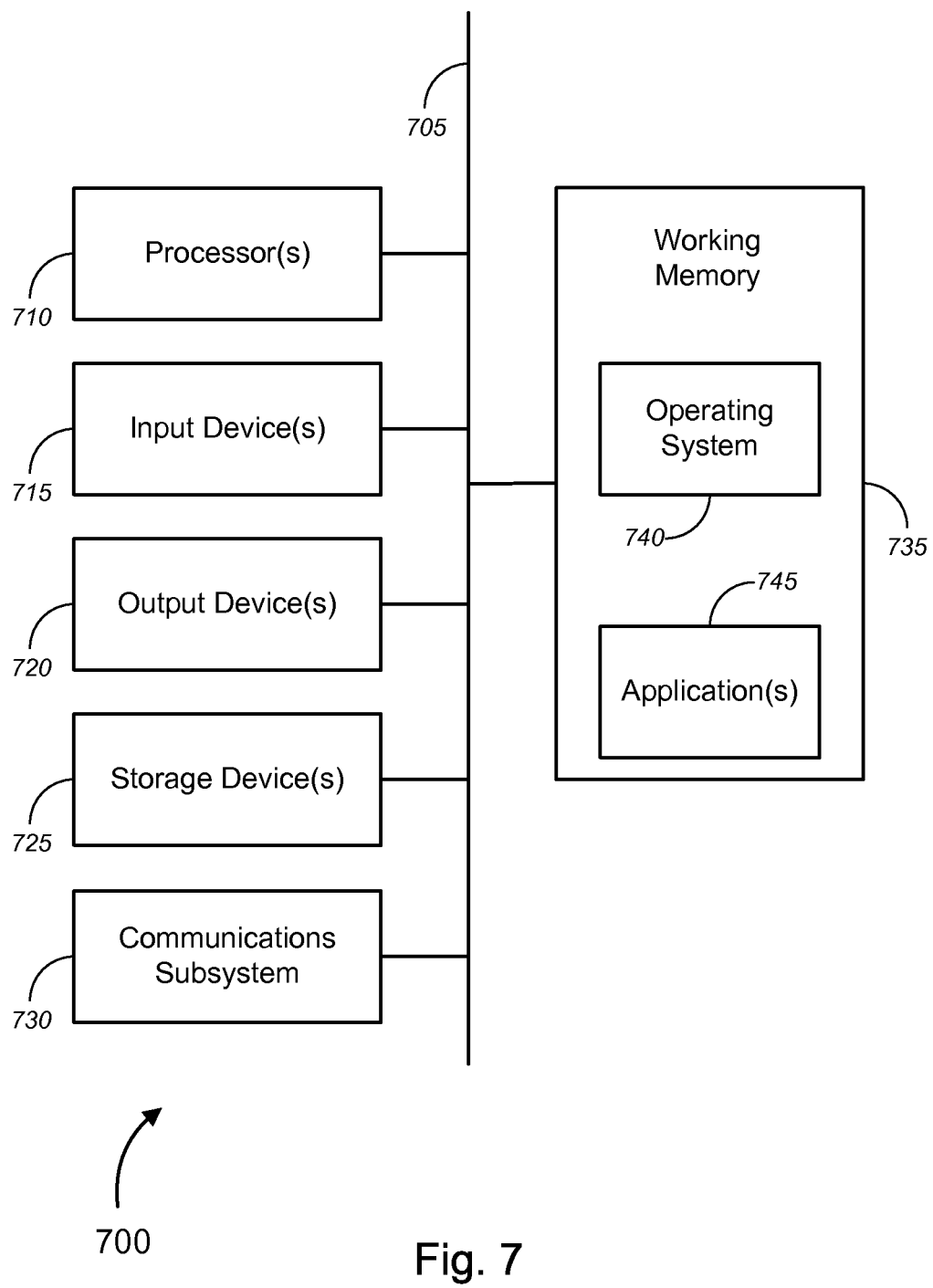
FIG. 7 is a block diagram illustrating an exemplary computer or system hardware architecture, in accordance with various embodiments.

FIG. 7 provides a schematic illustration of one embodiment of a computer system 700 that can perform the methods provided by various other embodiments, as described herein, and/or can function as a customer equipment, a user device, a user network interface ("UNI"), a network interface device ("NID"), an optical network terminal ("ONT"), a control server, an OAM server, server computer, a network management layer-configuration management ("NML-CM") controller, a layer 3/layer 2 flow domain ("L3/L2 FD") controller, a layer 3/layer 2 element management layer-configuration management ("L3/L2 EML-CM") controller, a NML-CM activation engine, a NML-CM modification engine, a service assurance engine, a fault isolation engine, a performance monitoring engine, a user-side provider edge ("U-PE") router, a network-side provider edge ("N-PE") router, or an internal network-to-network interface ("I-NNP") device, and/or the like. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 700 might also include a communications subsystem 730, which can include, without limitation, a modem, a network card (wireless or wired), an infrared communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer systems, and/or with any other devices described herein. In many embodiments, the computer system 700 will further comprise a working memory 735, which can include a RAM or ROM device, as described above.

The computer system 700 also may comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, and transmission media. Non-volatile media includes, for example, optical and/or magnetic disks, such as the storage device(s) 725. Volatile media includes, without limitation, dynamic memory, such as the working memory 735. Transmission media includes, without limitation, coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including, without limitation, radio, acoustic, and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with a first network device in a network, a service request, the service request originating from a first client device over the network;

determining, with the first network device, one or more second network devices for implementing a service arising from the service request;

determining, with the first network device, network technology utilized by each of the one or more second network devices;

generating, with the first network device, flow domain information, using flow domain analysis, based at least in part on the determined one or more second network devices and based at least in part on the determined network technology utilized by each of the one or more second network devices, wherein the service request comprises a Metro Ethernet Forum ("MEF") service request, wherein the MEF service request comprises vectors of at least two user network interfaces ("UNIs") and at least one Ethernet virtual circuit ("EVC"), wherein generating, with the first network device, the flow domain information, using flow domain analysis, comprises:

performing, with the first network device, an edge flow domain analysis;

determining, with the first network device, whether at least one of the one or more second network devices is included in a flow domain comprising an intra-provider edge router system for multi-dwelling units ("intra-MTU-s"), based on the edge flow domain analysis;

based on a determination that at least one of the one or more second network devices is included in a flow domain comprising an intra-MTU-s, determining, with the first network device, one or more edge flow domains;

based on a determination that at least one of the one or more second network devices does not include a flow domain comprising an intra-MTU-s, performing, with the first network device, a ring flow domain analysis;

determining, with the first network device, whether at least one of the one or more second network devices is included in one or more G.8032 ring flow domains, based on the ring flow domain analysis;

based on a determination that at least one of the one or more second network devices is included in one or more G.8032 ring flow domains, determining, with the first network device, the one or more G.8032 flow domains;

based on a determination that at least one of the one or more second network devices is not included in one or more G.8032 ring flow domains, performing, with the first network device, an aggregate flow domain analysis;

determining, with the first network device, whether at least one of the one or more second network devices is included in one or more aggregate flow domains, based on the aggregate flow domain analysis;

based on a determination that at least one of the one or more second network devices is included in one or more aggregate flow domains, determining, with the first network device, the one or more aggregate flow domains;

based on a determination that at least one of the one or more second network devices is not included in one or more aggregate flow domains, performing, with the first network device, a hierarchical virtual private local area network service ("H-VPLS") flow domain analysis;

determining, with the first network device, whether at least one of the one or more second network devices is included in one or more H-VPLS flow domains, based on the H-VPLS flow domain analysis; and based on a determination that at least one of the one or more second network devices is included in one or more H-VPLS flow domains, determining, with the first network device, the one or more one or more H-VPLS flow domains; and automatically configuring, with a third network device in the network, at least one of the one or more second network devices to enable performance of the service arising from the service request, based at least in part on the generated flow domain information.

2. The method of claim 1, wherein generating, with the first network device, flow domain information, using flow domain analysis, based at least in part on the determined one or more second network devices and based at least in part on the determined network technology utilized by each of the one or more second network devices comprises generating, with the first network device, a flow domain network ("FDN") object, using flow domain analysis, based at least in part on the determined one or more second network devices and based at least in part on the determined network technology utilized by each of the one or more second network devices.

3. The method of claim 2, wherein generating, with the first network device, the FDN object, using flow domain analysis comprises generating, with the first network device, a computed graph of flow domains indicating one or more network paths in the network through the one or more second network devices and indicating relevant connectivity associations of the one or more second network devices.

4. The method of claim 2, wherein generating, with the first network device, the FDN object, using flow domain analysis comprises utilizing an outside-in analysis that first analyzes relevant user network interfaces.

5. The method of claim 1, wherein determining, with the first network device, network technology utilized by each of the one or more second network devices comprises mapping, with the first network device, MEF services associated with the service request with the network technology utilized by each of the one or more second network devices.

6. The method of claim 5, wherein mapping, with the first network device, MEF services associated with the service request with the network technology utilized by each of the one or more second network devices comprises implementing, with the first network device, an intermediate abstraction between the MEF services and the network technology utilized by each of the one or more second network devices, using a layer network domain.

7. The method of claim 1, generating, with the first network device, the flow domain information comprises:

determining, with the first network device, a network path connecting each of the at least two UNIs with the at least one EVC; and generating, with the first network device, the flow domain information, wherein the flow domain information indicates the determined network path connecting each of the at least two UNIs with the at least one EVC and indicates connectivity associations for each of the at least two UNIs with the at least one EVC.

8. The method of claim 1, wherein generating, with the first network device, the flow domain information, using flow domain analysis, further comprises:

based on a determination that at least one of the one or more second network devices is not included in one or more H-VPLS flow domains, performing, with the first network device, a virtual private local area network service ("VPLS") flow domain analysis;

determining, with the first network device, whether at least one of the one or more second network devices is included in one or more VPLS flow domains, based on the VPLS flow domain analysis;

based on a determination that at least one of the one or more second network devices is included in one or more VPLS flow domains, determining, with the first network device, the one or more VPLS flow domains;

based on a determination that at least one of the one or more second network devices is not included in one or more VPLS flow domains, performing, with the first network device, a flow domain analysis for a provider edge router having routing and switching functionality ("PE_rs flow domain analysis");

determining, with the first network device, whether at least one of the one or more second network devices is included in a flow domain comprising one or more PE_rs, based on the PE_rs flow domain analysis;

based on a determination that at least one of the one or more second network devices is included in a flow domain comprising one or more PE_rs, determining, with the first network device, one or more PE_rs flow domains;

based on a determination that at least one of the one or more second network devices is not included in a flow domain comprising one or more PE_rs, performing, with the first network device, an interconnect flow domain analysis;

determining, with the first network device, whether at least one of the one or more second network devices is included in a flow domain comprising an external network-to-network interface ("E-NNI"), based on the interconnect flow domain analysis; and based on a determination that at least one of the one or more second network devices is included in a flow domain comprising an E-NNI, determining, with the first network device, one or more service provider or operator flow domains.

9. The method of claim 8, wherein generating, with the first network device, the flow domain information, using flow domain analysis, further comprises:

stitching, with the first network device, at least one of the determined one or more edge flow domains, the determined one or more G.8032 flow domains, the determined one or more aggregate flow domains, the determined one or more one or more H-VPLS flow domains, the determined one or more VPLS flow domains, the determined one or more PE_rs flow domains, or the determined one or more service provider or operator flow domains to generate the flow domain information indicating a flow domain network.

10. The method of claim 1, wherein the service arising from the service request comprises at least one of service activation, service modification, service assurance, fault isolation, or performance monitoring.

11. The method of claim 1, wherein the first network device comprises one of a network management layer - configuration management ("NML_CM") controller or a layer 3/layer 2 flow domain ("L3/L2 FD") controller.

12. The method of claim 1, wherein the third network device comprises one of a layer 3/layer 2 element management layer-configuration management ("L3/L2 EML-CM") controller, a NML-CM activation engine, a NML-CM modification engine, a service assurance engine, a fault isolation engine, or a performance monitoring engine.

13. The method of claim 1, wherein the first network device and the third network device are the same network device.

14. The method of claim 1, wherein each of the one or more second network devices comprise one of a user-side provider edge ("U-PE") router, a network-side provider edge ("N-PE") router, a provider ("P") router, or an internal network-to-network interface ("I-NNI") device.

15. The method of claim 1, wherein the network technology comprises one or more of G.8032 Ethernet ring protection switching ("G.8032 ERPS") technology, aggregation technology, hierarchical virtual private local area network service ("H-VPLS") technology, packet on a blade ("POB") technology, provider edge having routing and switching functionality ("PE_rs ") -served user network interface ("UNI") technology, multi-operator technology, or virtual private local area network service ("VPLS") technology.

16. A network device, comprising:
at least one processor; and
a non-transitory computer readable medium communicatively coupled to the at least one processor, the computer readable medium having stored thereon computer software comprising a set of instructions that, when executed by the at least one processor, causes the network device to perform one or more functions, the set of instructions comprising:

instructions for receiving a service request, the service request originating from a first client device over the network;

instructions for determining one or more second network devices for implementing a service arising from the service request;

instructions for determining network technology utilized by each of the one or more second network devices; and instructions for generating flow domain information, using flow domain analysis, based at least in part on the determined one or more second network devices and based at least in part on the determined network technology utilized by each of the one or more second network devices, wherein the flow domain information is used to automatically configure the at least one of the one or more second network devices to enable performance of the service arising from the service request, wherein the service request comprises a Metro Ethernet Forum ("MEF") service request, wherein the MEF service request comprises vectors of at least two user network interfaces ("UNIs") and at least one Ethernet virtual circuit ("EVC"), wherein the instructions for generating the flow domain information, using flow domain analysis, comprises:

instructions for performing an edge flow domain analysis;

instructions for determining whether at least one of the one or more second network devices is included in a flow domain comprising an intra-provider edge router system for multi-dwelling units ("intra-MTU-s"), based on the edge flow domain analysis;

instructions for, based on a determination that at least one of the one or more second network devices is included in a flow domain comprising an intra-MTU-s, determining one or more edge flow domains;

instructions for, based on a determination that at least one of the one or more second network devices does not include a flow domain comprising an intra-MTU-s, performing a ring flow domain analysis;

instructions for determining whether at least one of the one or more second network devices is included in one or more G.8032 ring flow domains, based on the ring flow domain analysis;

instructions for, based on a determination that at least one of the one or more second network devices is included in one or more G.8032 ring flow domains, determining the one or more G.8032 flow domains;

instructions for, based on a determination that at least one of the one or more second network devices is not included in one or more G.8032 ring flow domains, performing an aggregate flow domain analysis;

instructions for determining whether at least one of the one or more second network devices is included in one or more aggregate flow domains, based on the aggregate flow domain analysis;

instructions for, based on a determination that at least one of the one or more second network devices is included in one or more aggregate flow domains, determining the one or more aggregate flow domains;

instructions for, based on a determination that at least one of the one or more second network devices is not included in one or more aggregate flow domains, performing a hierarchical virtual private local area network service ("H-VPLS") flow domain analysis;

instructions for determining whether at least one of the one or more second network devices is included in one or more H-VPLS flow domains, based on the H-VPLS flow domain analysis; and instructions for, based on a determination that at least one of the one or more second network devices is included in one or more H-VPLS flow domains, determining the one or more one or more H-VPLS flow domains.

17. A system, comprising:
a first network device;
one or more second network devices; and
a third network device;
wherein the first network device comprises:
at least one first processor; and
a first non-transitory computer readable medium communicatively coupled to the at least one first processor, the first non-transitory computer readable medium having stored thereon computer software comprising a first set of instructions that, when executed by the at least one first processor, causes the first network device to perform one or more functions, the first set of instructions comprising:
instructions for receiving a service request, the service request originating from a first client device over the network;
instructions for determining one or more second network devices for implementing a service arising from the service request;
instructions for determining, with the first network device, network technology utilized by each of the one or more second network devices; and
instructions for generating, with the first network device, flow domain information, using flow domain analysis, based at least in part on the determined one or more second network devices and based at least in part on the determined network technology utilized by each of the one or more second network devices, wherein the service request comprises a Metro Ethernet Forum ("MEF") service request, wherein the MEF service request comprises vectors of at least two user network interfaces ("UNIs") and at least one Ethernet virtual circuit ("EVC"), wherein the instructions for generating, with the first network device, the flow domain information, using flow domain analysis, comprises:

instructions for performing, with the first network device, an edge flow domain analysis;

instructions for determining, with the first network device, whether at least one of the one or more second network devices is included in a flow domain comprising an intra-provider edge router system for multi-dwelling units ("intra-MTU-s"), based on the edge flow domain analysis;

instructions for, based on a determination that at least one of the one or more second network devices is included in a flow domain comprising an intra-MTU-s, determining, with the first network device, one or more edge flow domains;

instructions for, based on a determination that at least one of the one or more second network devices does not include a flow domain comprising an intra-MTU-s, performing, with the first network device, a ring flow domain analysis;

instructions for determining, with the first network device, whether at least one of the one or more second network devices is included in one or more G.8032 ring flow domains, based on the ring flow domain analysis;

instructions for, based on a determination that at least one of the one or more second network devices is included in one or more G.8032 ring flow domains, determining, with the first network device, the one or more G.8032 flow domains;

instructions for, based on a determination that at least one of the one or more second network devices is not included in one or more G.8032 ring flow domains, performing, with the first network device, an aggregate flow domain analysis;

instructions for determining, with the first network device, whether at least one of the one or more second network devices is included in one or more aggregate flow domains, based on the aggregate flow domain analysis;

instructions for, based on a determination that at least one of the one or more second network devices is included in one or more aggregate flow domains, determining, with the first network device, the one or more aggregate flow domains;

instructions for, based on a determination that at least one of the one or more second network devices is not included in one or more aggregate flow domains, performing, with the first network device, a hierarchical virtual private local area network service ("H-VPLS") flow domain analysis;

instructions for determining, with the first network device, whether at least one of the one or more second network devices is included in one or more H-VPLS flow domains, based on the H-VPLS flow domain analysis; and instructions for, based on a determination that at least one of the one or more second network devices is included in one or more H-VPLS flow domains, determining, with the first network device, the one or more one or more H-VPLS flow domains;
wherein the third network device comprises:
  at least one third processor; and
  a third non-transitory computer readable medium communicatively coupled to the at least one third processor, the third non-transitory computer readable medium having stored thereon computer software comprising a third set of instructions that, when executed by the at least one third processor, causes the third network device to perform one or more functions, the third set of instructions comprising:
    instructions for receiving the flow domain information from the first network device; and
    instructions for automatically configuring the at least one of the one or more second network devices to enable performance of the service arising from the service request, by sending configuration instructions to the at least one of the one or more second network devices;
wherein each of the one or more second network devices comprises:
  at least one second processor; and
  a second non-transitory computer readable medium communicatively coupled to the at least one second processor, the second non-transitory computer readable medium having stored thereon computer software comprising a second set of instructions that, when executed by the at least one second processor, causes the second network device to perform one or more functions, the second set of instructions comprising:
    instructions for receiving the configuration instructions from the third network device; and
    instructions for changing network configuration settings, based on the configuration instructions.

* * * * *